United States Patent
Kaneko

(10) Patent No.: US 9,838,552 B2
(45) Date of Patent: Dec. 5, 2017

(54) SYSTEM INCLUDING IMAGE PROCESSING APPARATUS AND FIRST SERVER FOR GENERATING PAGE INFORMATION AND ISSUING CORRESPONDING INSTRUCTION INFORMATION FOR THE IMAGE PROCESSING APPARATUS

(71) Applicant: CANON KABUSHIKI KAISHA, Tokyo (JP)

(72) Inventor: Tsuyoshi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/198,469

(22) Filed: Jun. 30, 2016

(65) Prior Publication Data

US 2017/0006171 A1 Jan. 5, 2017

(30) Foreign Application Priority Data

Jul. 1, 2015 (JP) ................................. 2015-132539

(51) Int. Cl.
H04N 1/00 (2006.01)

(52) U.S. Cl.
CPC ..... *H04N 1/00464* (2013.01); *H04N 1/00042* (2013.01); *H04N 1/00055* (2013.01); *H04N 1/00244* (2013.01); *H04N 1/00344* (2013.01); *H04N 1/00962* (2013.01); *H04N 2201/0094* (2013.01)

(58) Field of Classification Search
None
See application file for complete search history.

(56) References Cited

U.S. PATENT DOCUMENTS

| 8,555,159 | B1* | 10/2013 | Shmulevich | G06F 17/2235 715/255 |
| 9,609,029 | B2* | 3/2017 | Ohara | H04L 65/1073 |
| 2002/0120683 | A1* | 8/2002 | Gomes | G06F 17/30899 709/203 |
| 2012/0257248 | A1* | 10/2012 | Sato | G06F 8/65 358/1.15 |
| 2014/0082173 | A1* | 3/2014 | Kaneko | H04N 1/00344 709/223 |
| 2016/0094732 | A1* | 3/2016 | Nakamura | H04N 1/00244 358/440 |

FOREIGN PATENT DOCUMENTS

JP 2006-268650 A 10/2006

* cited by examiner

*Primary Examiner* — Thomas D Lee
(74) *Attorney, Agent, or Firm* — Cowan, Liebowitz & Latman, P.C

(57) ABSTRACT

A managing server accepts an instruction of a message intended to be displayed on a screen of an image processing apparatus from a user, and generates page information including the message and first instruction information corresponding to the accepted instruction. The image processing apparatus periodically performs a first inquiry about instruction information for the image processing apparatus to the managing server, displays, in response to a notification based on the first instruction information from the managing server, a message corresponding to the notification in a status display area of a displaying unit, acquires the page information including the message related to the first instruction information from the managing server, and displays the acquired page information on the displaying unit.

9 Claims, 21 Drawing Sheets

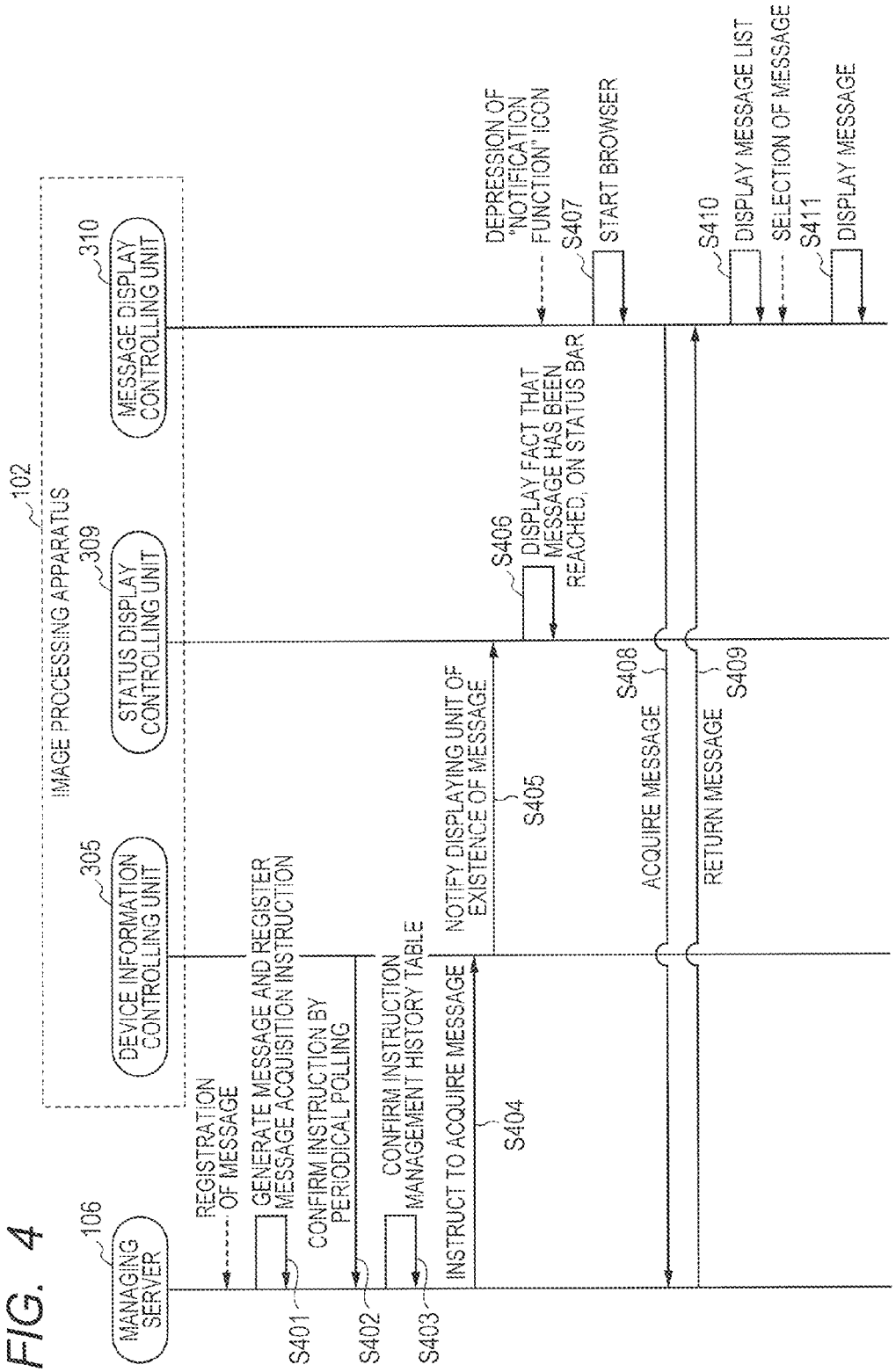

FIG. 5A

```
EDIT OF NOTIFICATION MESSAGE

◀ RETURN
506 —[ SAVE ] [ DELETE ]

BE SURE TO INPUT ITEMS OF ※
DISPLAY RANGE
       ※ SALES COMPANY NAME:  [ABC SALES          ▼]
501 {  ※ CUSTOMER NAME:        [XX COMMERCIAL COMPANY ▼]
       ※ MONITOR ID:           [AAA123456789      ▼]
       ※ DEVICE ID:            [DEV00001          ▼]
MESSAGE CONTENTS
※ TITLE:                        [NOTIFICATION OF TONER DELIVERY] } 502

※ MESSAGE:                      [DELIVERY PROCEDURE OF
                                 FOLLOWING CONSUMABLE
                                 SUPPLY WAS COMPLETED
                                 YELLOW TONER: 1               ] } 503

SYSTEM LINK
URL:                             [http://delivery/com/status]
DATE
DISPLAY START DATE (yyyy/mm/dd)  [2015/04/16  ] } 504
DISPLAY END DATE (yyyy/mm/dd)    [2015/04/30  ] } 505

UPDATE INFORMATION
CREATOR:                         CREATION DATE:
FINAL UPDATER:                   FINAL UPDATE DATE:

506 —[ SAVE ] [ DELETE ]
◀ RETURN
```

FIG. 5B

```
<title>index</title>
</head>
<body>
<div ng-controller="myController">
<ul ng-show="id<0">
    <p style="font-family: 'MEIRYO';"> <MESSAGE LIST> </p>
    <table ng-class="'table_list'">
        <thead>
            <tr><td>SUBJECT</td><td>REGISTRATION DATE AND TIME</td></tr>
        </thead>
        <tbody>
            <tr ng-repeat="message in messages" ng-click="showDetail($index)">
                <td>{{message.subject}}</td><td>{{message.date}}</td>
            </tr>
            <tr><td>    </td><td>    </td></tr>
            <tr><td>    </td><td>    </td></tr>
            <tr><td>    </td><td>    </td></tr>
            <tr><td>    </td><td>    </td></tr>
        </tbody>
    </table>
<button ng-class="'button_update'">ACQUISITION OF LATEST MESSAGE</button>
<button ng-class="'button_ok_list'">OK</button>
<button ng-class="'button_prev'" ng-disabled="true">▲</button>
<button ng-class="'button_next'" ng-disabled="false">▼</button>
</ul>
<ul ng-show="0<=id">
    <p style="font-family: 'MEIRYO';"> <MESSAGE DETAILED INFORMATION> </p>
    <table ng-class="'table_detail'">
        <tr><td><b> · SUBJECT</b></td></tr>
        <tr><td>   {{messages[id].subject}}</td></tr>
        <tr><td><b> · MESSAGE DETAIL</b></td></tr>
        <tr><td>   {{messages[id].body}}</td></tr>
        <tr><td>    </td></tr>
        <tr><td><b> · REGISTRATION DATE AND TIME</b>    {{messages[id].date}}</td></tr>
        <tr><td>    </td></tr>
    </table>
<button ng-click="toList()" ng-class="'button_ok_detail'">OK</button>
...
```

*FIG. 7A*

| ✓ | SUBJECT | REGISTRATION DATE AND TIME |
|---|---|---|
| ☐ ✉ | NOTIFICATION OF TONER DELIVERY | 2015/04/16 14:20 |
| ☐ ✉ | NOTIFICATION OF RECOVERED TONER BOX DELIVERY | 2015/01/09 12:31 |
| ☐ ✉ | NOTIFICATION OF TONER DELIVERY | 2014/12/24 11:51 |
| ☐ ✉ | NOTIFICATION OF FIRMWARE UPDATE | 2014/05/30 11:51 |
| ☐ ✉ | NOTIFICATION OF REGULAR INSPECTION | 2014/04/06 10:13 |

<MESSAGE LIST> — 703, 701, 702, 704, 1/3

↻ ACQUIRE LATEST MESSAGE    DELETE    ◀ RETURN 706, 705

*FIG. 7B*

<MESSAGE DETAILED INFORMATION>

710 — ■ SUBJECT
      NOTIFICATION OF TONER DELIVERY

711 — ■ MESSAGE DETAIL
      DELIVERY PROCEDURE OF FOLLOWING
      CONSUMABLE SUPPLY WAS COMPLETED
        YELLOW TONER: 1

712 — ■ REGISTRATION DATE AND TIME
        2015/04/16 14:20

713 — ■ DISPLAY END DATE
        2015/04/30

```
EDIT OF NOTIFICATION MESSAGE

◀ RETURN        800
[SAVE] [DELETE]
BE SURE TO INPUT ITEMS OF ※
DISPLAY RANGE
※ SALES COMPANY NAME:  [ABC SALES ▼]
※ CUSTOMER NAME:       [XX COMMERCIAL COMPANY ▼]
※ MONITOR ID:          [AAA123456789 ▼]
※ DEVICE ID:           [DEV00001 ▼]
MESSAGE CONTENTS
※ TITLE:               [NOTIFICATION OF TONER DELIVERY]

┌─────────────────────────────┐
                       │ DELIVERY PROCEDURE OF       ▲│
※ MESSAGE:             │ FOLLOWING CONSUMABLE         │
                       │ SUPPLY WAS COMPLETED         │
                       │ YELLOW TONER: 1              │
                       │                              │
                       │                             ▼│
                       └─────────────────────────────┘
SYSTEM LINK
URL:                   [http://delivery/com/status]
DATE
DISPLAY START DATE (yyyy/mm/dd)  [2015/04/16]
DISPLAY END DATE (yyyy/mm/dd)    [2015/04/30]

UPDATE INFORMATION
CREATOR:                          CREATION DATE:
FINAL UPDATER:                    FINAL UPDATE DATE:
[SAVE] [DELETE]
◀ RETURN        800
```

FIG. 8B

| | SUBJECT | REGISTRATION DATE AND TIME |
|---|---|---|
| ✓ 801 | | |
| ☐ ✉ | NOTIFICATION OF TONER DELIVERY | 2015/04/16 14:20 |
| ☑ ✉ | NOTIFICATION OF RECOVERED TONER BOX DELIVERY | 2015/01/09 12:31 |
| ☑ ✉ | NOTIFICATION OF TONER DELIVERY | 2014/12/24 11:51 |
| ☐ ✉ | NOTIFICATION OF FIRMWARE UPDATE | 2014/05/30 11:51 |
| ☐ ✉ | NOTIFICATION OF REGULAR INSPECTION | 2014/04/06 10:13 |

<MESSAGE LIST>

↻ ACQUIRE LATEST MESSAGE   DELETE   ◀ RETURN

1/3

802

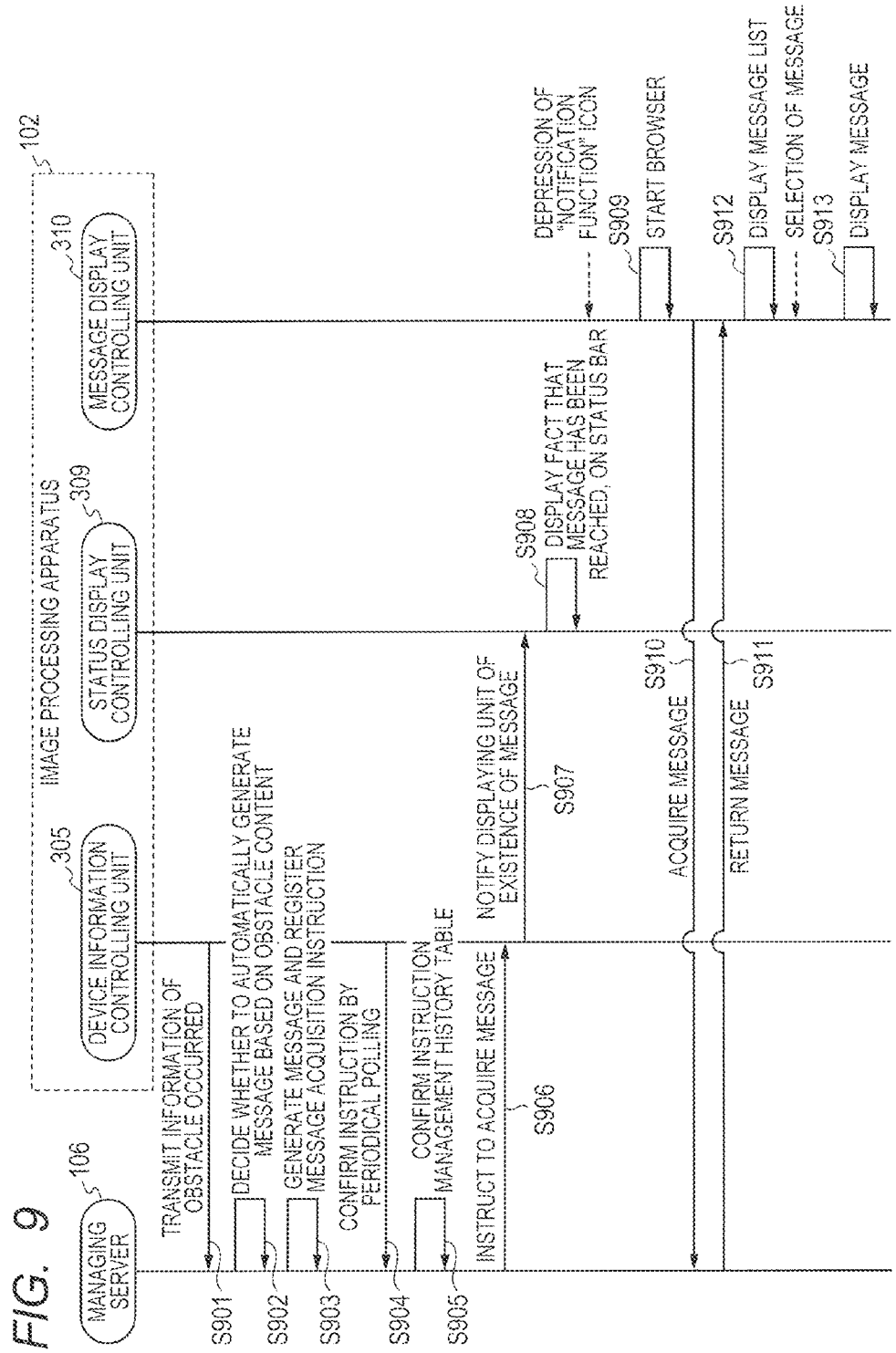

FIG. 13

```
<MESSAGE DETAILED INFORMATION>

■ SUBJECT
    NOTIFICATION OF FIRMWARE UPDATE

■ MESSAGE DETAIL
    SINCE FIRMWARE UPDAE FOR MAIN BODY IS PERFORMED,
    PLEASE DO NOT TURN OFF POWER SUPPLY DURING
    FOLLOWING PERIOD OF TIME

[UPDATE SCHEDULED DATE AND TIME]   2015/04/23  0:30

■ REGISTRATION DATE AND TIME
    2015/04/16  14:20
  ■ DISPLAY END DATE
    2015/04/30

```
<MESSAGE DETAILED INFORMATION>

■ SUBJECT
    NOTIFICATION OF FIRMWARE UPDATE

■ MESSAGE DETAIL
    DO YOU APPROVE UPDATE OF FIRMWARE OF
    MAIN BODY AT FOLLOWING DATE AND TIME?

1501 ─┤ YES ┃ NO ├─ 1502

[UPDATE SCHEDULED DATE AND TIME]  2015/04/23  0:30

■ REGISTRATION DATE AND TIME
    2015/04/16  14:20
  ■ DISPLAY END DATE
    2015/04/30

```
EDIT OF NOTIFICATION MESSAGE

◀ RETURN
[ SAVE ] [ DELETE ]
BE SURE TO INPUT ITEMS OF ※
DISPLAY RANGE
※ SALES COMPANY NAME:   [ABC SALES          ▼]
※ CUSTOMER NAME:        [XX COMMERCIAL COMPANY ▼]
※ MONITOR ID:           [AAA123456789      ▼]
※ DEVICE ID:            [DEV00001          ▼]
MESSAGE CONTENTS
※ TITLE:                [NOTIFICATION OF TONER DELIVERY]

┌──────────────────────────────┐
                        │ DELIVERY PROCEDURE OF        │▲
                        │ FOLLOWING CONSUMABLE         │
※ MESSAGE:              │ SUPPLY WAS COMPLETED.        │
                        │ YELLOW TONER: 1              │
                        │ [DELIVERY MANAGEMENT NUMBER] │
                        │ 83748392910                  │
                        │ [DELIVERY COMPANY]           │
                        │ XX TRANSPORTATION COMPANY    │
                        └──────────────────────────────┘▼

SYSTEM LINK
URL:                    [http://delivery.com/status   ]
DATE
```

SYSTEM INCLUDING IMAGE PROCESSING APPARATUS AND FIRST SERVER FOR GENERATING PAGE INFORMATION AND ISSUING CORRESPONDING INSTRUCTION INFORMATION FOR THE IMAGE PROCESSING APPARATUS

BACKGROUND OF THE INVENTION

Field of the Invention

The present invention relates to a technique for providing various messages related to maintenance and management services.

Description of the Related Art

Conventionally, there has been proposed a system in which a managing server sends notifications to a dispatcher, a service person, a person in charge of consumable supplies, and the like in a sales company, in accordance with event information (error, alarm, jam) notified from an image processing apparatus.

The conventional image processing apparatus sends such information as above to the managing server, and also urges a customer user to deal with (or cope with) an event occurred in the image processing apparatus by causing a display panel to display a notification sent from the managing server. For example, when a fact that the remaining amount of toner is small is displayed on the display panel, the customer user who watched the display and found the relevant fact requests a call center of the sales company to confirm the delivery situation of the toner and/or requests delivery of the toner. Conventionally, since information (an execution time, etc.) related to firmware update and maintenance of the image processing apparatus is not displayed on the display panel, the customer user does not grasp the relevant information.

Japanese Patent Application Laid-Open No. 2006-268650 proposes the technique of facilitating order of the consumable supply of the image processing apparatus and confirmation of the appointed date of delivery thereof. More specifically, in the relevant technique, the fact that the time for replacement of the consumable supply is approaching is detected and displayed on the screen, and, when the customer orders the relevant consumable supply on the screen, the order data is transmitted to the managing server, and then the data indicating the given date of delivery from the managing server is received and displayed on the screen.

Conventionally, the specific notifications related to the remaining amount, the date of delivery and the like of the consumable supply can be displayed on the displaying unit of the image processing apparatus. However, since miscellaneous maintenance and management services are necessary for the image processing apparatus, it is impossible to sufficiently deal with these services only by the conventional specific notifications.

For example, since the information (the execution time, etc.) related to the firmware update and the maintenance is not displayed on the displaying unit of the conventional image processing apparatus, the customer user cannot grasp the execution time of the firmware update. For this reason, there may be a case where the firmware is not normally updated because the power supply of the image processing apparatus is carelessly turned off during the update. In this case, since the user or the like of the sales company has to perform an inefficient or unnecessary operation of, for example, rearranging the update of the firmware, there is a possibility that dealing with the customer becomes late. As just described, since it is conventionally impossible to deal with various notifications to be sent to the customer user in the maintenance and management services for the image processing apparatus, there is a possibility that the maintenance and management services become inefficient, and there is a possibility that such dealing affects the maintenance and management services.

SUMMARY OF THE INVENTION

An object of the present invention is to provide, in the maintenance and management services for an image processing apparatus, a mechanism of causing the displaying unit of the image processing apparatus to display various messages to be notified to a customer user.

An image processing apparatus according to one aspect of the present invention is characterized by comprising: a monitoring unit configured to have a function to transmit operation information of the image processing apparatus to a first server, and a function to perform an inquiry about instruction information for the image processing apparatus to the first server at periodical timing; a first controlling unit configured to have a function to display, in response to a notification based on first instruction information from the first server to the inquiry about the instruction information, a message corresponding to the notification in a status display area of a displaying unit of the image processing apparatus; and a second controlling unit configured to have a function using a web browser to acquire page information including a message related to the first instruction information from the first server, and display the message on the displaying unit of the image processing apparatus by using the acquired page information.

Further features of the present invention will become apparent from the following description of exemplary embodiments with reference to the attached drawings.

BRIEF DESCRIPTION OF THE DRAWINGS

FIG. 4 is a sequence diagram for describing the process to be performed between the managing server and the image processing apparatus.

FIG. 5A is a diagram for illustrating an example of a message registration screen.

FIG. 5B is a diagram for illustrating HTML (HyperText Markup Language) codes on a message screen.

FIGS. 7A and 7B are diagrams for illustrating examples of a message list screen and a message screen respectively displayed on the image processing apparatus.

FIGS. 8A and 8B are diagrams for illustrating screens respectively used when deleting messages from the managing server and the image processing apparatus.

FIG. 9 is a sequence diagram for describing a message automatic generating process by the managing server.

FIG. 13 is a diagram for illustrating an example of the screen of a firmware update message according to the first embodiment.

FIG. 15 is a diagram for illustrating an example of the screen of a firmware update message according to the third embodiment.

FIG. 17 is a diagram for illustrating an example of the delivery situation message registration screen on the managing server.

DESCRIPTION OF THE EMBODIMENTS

Hereinafter, preferred embodiments of the present invention will be described with reference to the attached drawings.

First Embodiment

Figure 1:
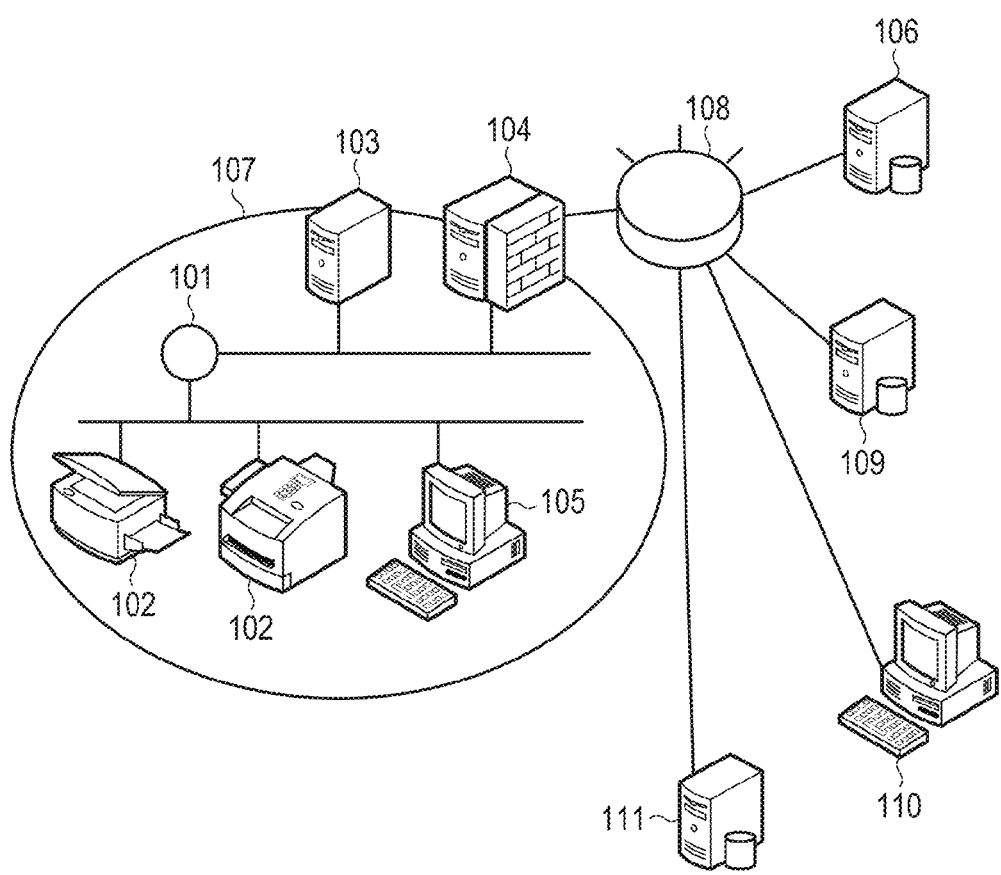
FIG. 1 is a diagram for illustrating the configuration of a system including an image processing apparatus and a managing server, according to the embodiment of the present invention.

FIG. 1 is a diagram for exemplarily illustrating the configuration of a system including an image processing apparatus and a managing server, according to the embodiment of the present invention.

In FIG. 1, image processing apparatuses 102, a proxy server 103, a firewall 104 and a PC (personal computer) 105 are mutually and communicably connected with others via a LAN (local area network) 101.

The firewall 104 is provided to improve security of the Internet. The PC 105 is the computer which is used by general users in business or the like. The PC may be a tablet terminal, a smartphone or the like. The image processing apparatuses 102, the proxy server 103 and the firewall 104 are mutually connected with others via the LAN 101 in an Intranet environment 107.

A managing server 106 is also called a maintenance system server. The managing server 106 has the function to unitarily manage the counter of the image processing apparatus 102 and the operation state thereof based on the operation information, the function to perform stock management of the consumable supplies based on the status information of the consumable supplies of the image processing apparatus 102, and the like. Hereinafter, the information of the image processing apparatus 102 will be called device information.

The Intranet environment 107 and the managing server 106 are connected to each other via the Internet 108. The image processing apparatus 102 transmits the device information of the image processing apparatus 102 to the managing server 106 which has been set as the transmission destination of the device information such as the operation information and the like of the image processing apparatus 102. Incidentally, although the example illustrated in FIG. 1 only includes the single Intranet environment 107, the plurality of Intranet environments 107 and the managing server 106 are in fact connected mutually via the Internet 108.

For example, the image processing apparatus 102 can be applied to the image forming apparatuses such as a digital complex machine, a facsimile apparatus, a printer, a scanner, an MFP (multifunction peripheral), and the like. Also, the image processing apparatus 102 can be applied to a digital medical equipment, a network camera, a car navigation system, various network home electrical appliances, and the like.

A firmware managing server 109 delivers firmware in order to remotely update the firmware of the image processing apparatus 102.

Also, a sales company user PC 110, and a delivery system 111 of a delivery company being an external system are connected to the Internet 108.

The sales company user PC 110 is the PC which is used by a user of the sales company. The sales company user PC 110 may be also a tablet terminal, a smartphone or the like.

The delivery system 111 manages the delivery situation of the consumable supply. Incidentally, the delivery system 111 will be described in the later-described fourth embodiment.

In the present embodiment, it is assumed that the protocol such as the HTTP (HyperText Transfer Protocol), the HTTPS (HyperText Transfer Protocol Secure) or the like is used as the communication protocol. However, the communication protocol is not specifically limited to the above protocol. For example, the example illustrated in FIG. 1 will be described on the assumption that the image processing apparatus 102 transmits the data to the managing server 106 via the proxy server 103 and the firewall 104, by using the HTTPS. However, the present invention is not limited to such a constitution.

Figure 2A:
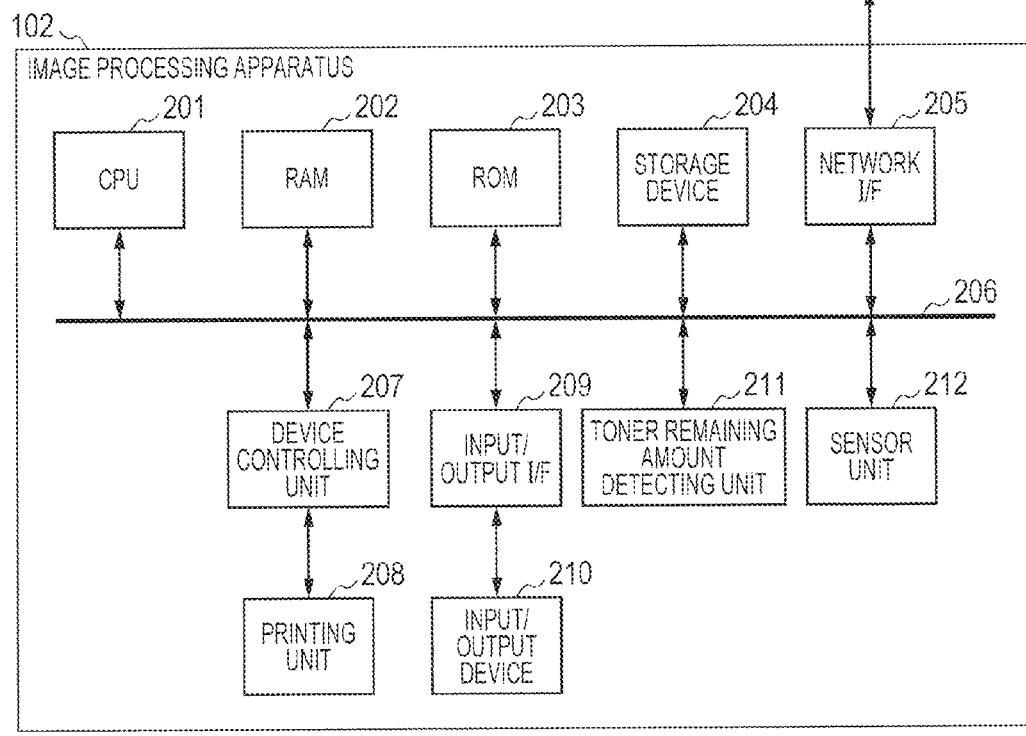
FIGS. 2A and 2B are block diagrams for illustrating the hardware constitutions of the image processing apparatus and the managing server respectively.

FIG. 2A is a block diagram for illustrating the hardware constitution of the image processing apparatus 102.

The image processing apparatus 102 comprises a CPU (central processing unit) 201, an RAM (random-access memory) 202, an ROM (read only memory) 203, a storage device 204, a network I/F (interface) 205, an internal bus 206, a device controlling unit 207, a printing unit 208, an input/output I/F 209, an input/output device 210, a toner remaining amount detecting unit 211, a sensor unit 212, and the like.

The CPU 201 totally controls the respective devices via the internal bus 206. Here, the CPU 201, the RAM 202, the ROM 203, the storage device 204, the network I/F 205, the device controlling unit 207, the input/output I/F 209, the toner remaining amount detecting unit 211, the sensor unit 212, and the like are connected to the internal bus 206.

The programs (including the program for achieving a software configuration illustrated in later-described FIG. 3A) have been stored in the ROM 203.

The RAM 202 functions as the memory and the work area for the CPU 201.

The CPU 201 executes the above programs with the RAM 202 and the ROM 203, and also records image data in a recording medium such as the storage device 204 or the like.

In addition to the above programs, the destination information indicating the area to which the image processing apparatus 102 is shipped, and the like have been stored in the ROM 203. The language and the like to be displayed by the input/output device 210 are determined based on the destination information.

The storage device 204 can also function as an external storage device to store, in addition to the image data or the like, the counter information, the system information and the monitoring information, on behalf of the backup RAM 202.

The network I/F 205 bi-directionally or two-directionally exchanges the data to/from an external network equipment or PC, via the LAN 101.

The device controlling unit 207 controls the printing unit 208. For example, the printing unit 208 is an electrophotographic printer which has an exposure unit, a transfer unit, a fixing unit and the like.

The input/output device 210 has a plurality of roles for data input/output to/from the image processing apparatus 102. More specifically, the input/output device accepts an input (a button input or the like) from a user, and transfers the signal corresponding to the accepted input to the above processing units by the input/output I/F 209. In addition, the input/output device 210 includes a display (a touch panel or the like) for providing the necessary information for the user and accepting the user operations. Moreover, the input/output device 210 may include a scanner for reading an original document, and accepting electronic data as the input.

The toner remaining amount detecting unit 211 detects the remaining amount of a toner in the printing unit 208 by a sensor, and generates the detected amount as a signal such as an alert signal, an alarm signal or the like. The sensor unit 212 can detect whether a toner bottle has been attached or detached, and read the serial number of the set toner bottle. Incidentally, although the toner is exemplarily described as the consumable supply of the image processing apparatus 102, the present invention may be applied to other consumable supplies.

Figure 2B:
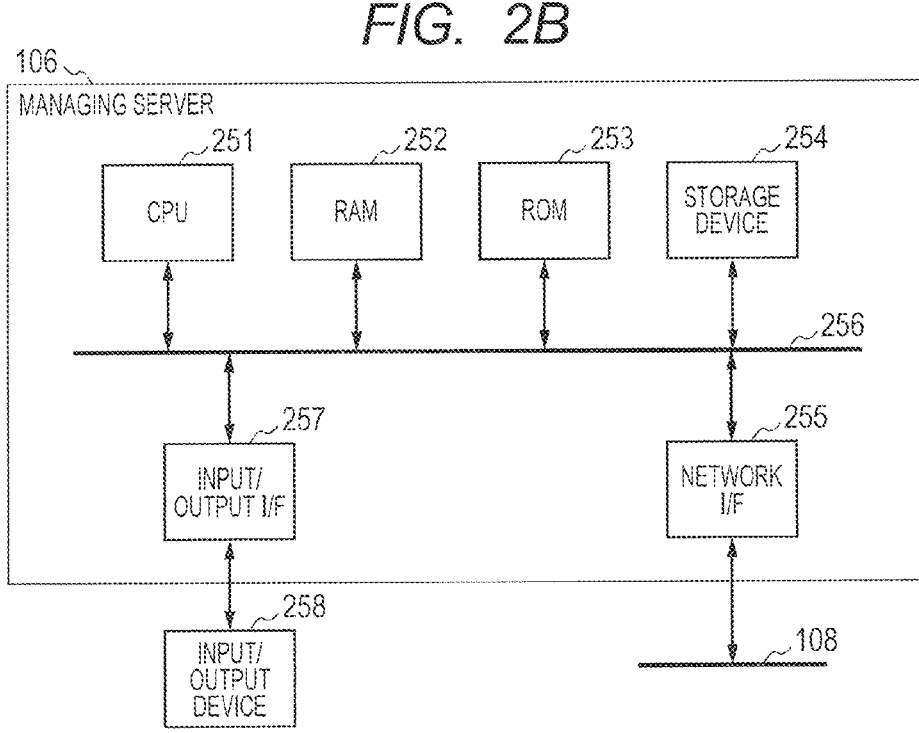

FIG. 2B is a block diagram for illustrating the hardware constitution of the managing server 106.

A CPU 251 totally controls the respective devices via an internal bus 256. Here, the CPU 251, an RAM 252, an ROM 253, a storage device 254, a network I/F 255, an input/output I/F 257 and the like are connected to the internal bus 256.

The programs (including the program for achieving a software configuration illustrated in later-described FIG. 3B) have been stored in the ROM 253 and the storage device 245.

The RAM 252 functions as the memory and the work area for the CPU 251.

The CPU 251 executes the above programs with the RAM 252, the ROM 253 and the storage device 254, and also records data in a recording medium such as the storage device 254 or the like.

The storage device 254 is constituted by an HDD (hard disk drive), an SSD (solid state drive) or the like. The storage device 254 can function as an external storage device to store, in addition to the management information of the image processing apparatus 102, the system information and the process information, on behalf of the backup RAM 252.

The input/output I/F 257 comprises, e.g., a PS/2 port, a USB (universal serial bus) I/F, an analog display I/F and/or a digital display I/F. An input/output device 258, which is constituted by a keyboard, a mouse, a CRT (cathode ray tube) display and/or a liquid crystal display, can be connected to the managing server 106 via the input/output I/F 257.

The managing server 106 can perform communication with the image processing apparatus 102, the PC 105 and the sales company user PC 110 via the LAN 101, the the Intranet environment 107 and the Internet 108, by using the network I/F 255.

Incidentally, it is assumed that the hardware constitution of the firmware managing server 109 is the same as that of the managing server 106 described above. Also, it is assumed that the hardware constitution of each of the PC 105, the sales company user PC 110 and the delivery system 111 is the same as that of the managing server 106 described above.

Figure 3A:
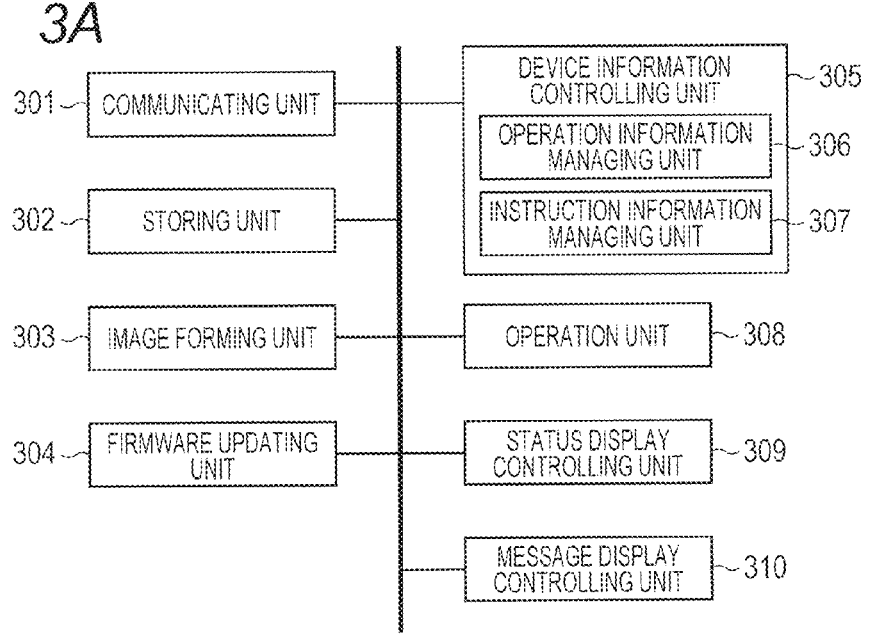
FIGS. 3A and 3B are block diagrams for illustrating the software configurations of the image processing apparatus and the managing server respectively.

FIG. 3A is a block diagram for illustrating, in the image processing apparatus 102, the software module configuration for the functions related to the present invention.

The image processing apparatus 102 comprises a communicating unit 301, a storing unit 302, an image forming unit 303, a firmware updating unit 304, a device information controlling unit 305, an operation unit 308 and a displaying unit, as software modules. Incidentally, the displaying unit consists of a status display controlling unit 309 and a message display controlling unit 310.

The communicating unit 301 transmits the device information related to the image processing apparatus 102 to the managing server 106. Moreover, the communicating unit 301 receives an instruction and information transmitted from the managing server 106. Such transmission and reception are performed by the communication according to the protocols of the SMTP (Simple Mail Transfer Protocol), the HTTP and/or the HTTPS.

The storing unit 302 transmits/receives information to/from the storage areas of the RAM 202, the ROM 203 and the storage device 204. The storing unit 302 stores the data indicating the operation histories and various abnormal states of the image processing apparatus 102 in the storage area as the device information. Incidentally, the device information includes image processing apparatus identification information such as an apparatus ID or the like, and communication information such as an IP address or the like. Moreover, the device information includes counter information, abnormal state occurrence information, and other various kinds of device information. The storing unit 302 stores the communication information such as the IP address of the managing server 106 managing the image processing apparatus 102 in the storage area as the managing server information.

The image forming unit 303 has the function to generate and output print data.

The firmware updating unit 304 performs update management of the firmware information of the image processing apparatus 102. More specifically, the firmware updating unit 304 receives or accepts the firmware update instruction from the managing server 106 via the device information controlling unit 305, and then actually updates the firmware. When updating the firmware, the firmware updating unit 304 inquires the firmware managing server 109 of the firmware, acquires the relevant firmware from the firmware managing server 109, and then performs the update of firmware. The firmware updating unit 304 notifies the firmware managing server 109 or the managing server 106, via the device information controlling unit 305, of the result of the update.

The device information controlling unit 305 performs the print control, the management of abnormal state and the like for the image processing apparatus 102, and also performs the management of the counter information and the management of notification information. Moreover, the device information controlling unit 305 controls the settings of hue adjustment, a print mode and other functions.

The device information controlling unit 305 comprises an operation information managing unit 306 and an instruction information managing unit 307.

When an obstacle occurs in the image processing apparatus 102, the operation information managing unit 306 generates the obstacle information to be transmitted to the managing server 106. Here, the operation information managing unit 306 manages, in addition to the obstacle information, the information (consumable supply information) related to the consumable supplies such as the toners, the parts and the like. The obstacle information, the consumable supply information, and the operation information such as the counter information of the image processing apparatus 102 are transmitted to the managing server 106 via the network I/F 205. The kind and the transmission timing of the information to be transmitted are set in response to the instruction from the managing server 106.

The instruction information managing unit 307 performs the process in response to the instruction from the managing server 106, and notifies the managing server 106 of the result of the process. According to the content of the instruction, the instruction information managing unit 307 instructs each unit to perform the process, and notifies the managing server 106 of the result of the process at each unit.

The operation unit 308 is the interface which enables the operation instruction such as a customer user's print instruction to the image processing apparatus 102.

The status display controlling unit 309 controls the notification display related to the state information of the image processing apparatus 102, in regard to the status display area such as the status bar or the like of the input/output device 210. Moreover, the status display controlling unit 309 controls, in regard to the status bar or the like, the notification display indicating the message reception according to the acquisition of the instruction information or the like from the managing server 106.

The message display controlling unit 310 starts the web browser function (web browser, etc.) in response to a user's operation, and controls the display of the message or the like from the managing server 106.

Figure 3B:
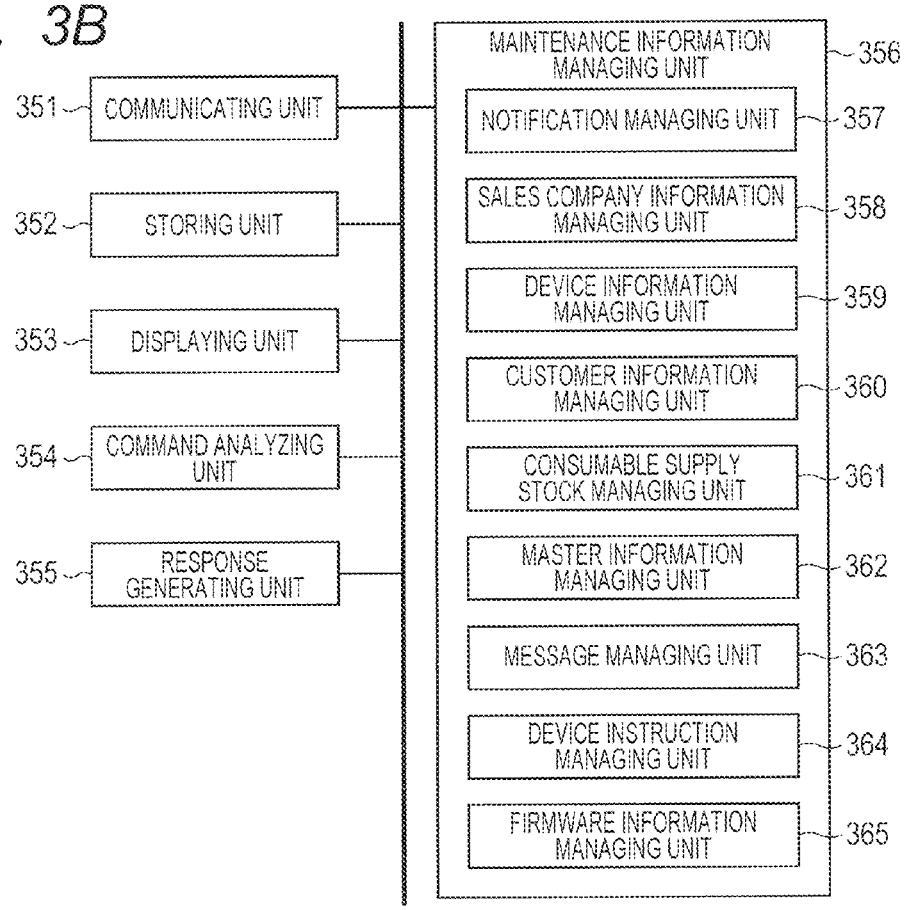

FIG. 3B is a block diagram for illustrating, in the managing server 106, the software module configuration for the functions according to the present invention.

The managing server 106 comprises a communicating unit 351, a storing unit 352, a displaying unit 353, a command analyzing unit 354, a response generating unit 355 and a maintenance information managing unit 356, as software modules.

The communicating unit 351 has the function to perform communication with the image processing apparatus 102. More specifically, the communicating unit 351 receives the device information transmitted from the image processing apparatus 102, and transmits necessary instruction and information to the image processing apparatus 102. Here, counter value to be managed indicates the total number of prints given by the image processing apparatus 102.

The storing unit 352 transmits/receives the information to/from the RAM 252, the ROM 253 and the storage area of the storage device 254, to store the device information, the sales company information, the customer information and the like in the storage area and the like.

The displaying unit 353 performs the process to display the device information stored in the storing unit 352, as a web screen. Since the WWW (World Wide Web) server program runs in the managing server 106, the web screen is provided to the web browser according to a request from the web browser. Thus, the service person and the like of the sales company can browse the above information by using the web browser on the sales company user PC 110. Hereinafter, a website to be used to browse the web screen will be called a portal site.

The command analyzing unit 354 analyzes a command transmitted from the image processing apparatus 102. The command analyzing unit 354 reflects the analyzed result in the storing unit 352, the maintenance information managing unit 356 and the displaying unit 353.

The response generating unit 355 generates a response to the command analyzed by the command analyzing unit 354, and transmits the generated response to the image processing apparatus 102.

The maintenance information managing unit 356 has the control function to manage information necessary for monitoring the image processing apparatus 102 and performing maintenance thereof. The maintenance information managing unit 356 comprises a notification managing unit 357, a sales company information managing unit 358, a device information managing unit 359, a customer information managing unit 360, and a consumable supply stock managing unit 361. Also, the maintenance information managing unit 356 comprises a master information managing unit 362, a message managing unit 363, a device instruction managing unit 364, and a firmware information managing unit 365.

The notification managing unit 357 generates notification information, designates a notification destination, and generates notification data. For example, the notification by the notification managing unit 357 includes a maintenance request notification to the service person who performs the maintenance of the image processing apparatus 102, a consumable supply replenishment request notification, of the like.

The sales company information managing unit 358 manages information of the image processing apparatus 102 which has been installed at the customer side, and information of the sales company which supports the installed image processing apparatus.

The device information managing unit 359 manages the image processing apparatus 102 to which the maintenance should be performed. For example, the identification information of the image processing apparatus, the abnormal state information of the image processing apparatus, the maintenance history, the manager information of the image processing apparatus, the consumable supply information of the image processing apparatus and the like are managed by the device information managing unit 359. Incidentally, the abnormal state information, which includes the operation information indicating an error, an alarm, a jam and the like, is displayed on the portal site, and thus browsed by the dispatcher, the service person and the like of the sales company. For example, the status of the operation information is managed such as "the sales company does not yet deal with the abnormal state", "the sales company is dealing with the abnormal state", "the sales company already dealt with the abnormal state" and the like in accordance with the dealing situation of the sales company.

The customer information managing unit 360 manages the information of the customer for which the image processing apparatus 102 has been installed. The information to be managed by the customer information managing unit 360 includes information related to the maintenance contract between the customer and the sales company.

The consumable supply stock managing unit 361 performs stock management of the consumable supplies such as toners, inks, parts and the like of the image processing apparatus 102. More specifically, the consumable supply stock managing unit 361 performs so-called stock subtraction on the basis of the information indicating the toner/ink remaining amounts and the part replacement information transmitted from the image processing apparatus 102, and then performs a notification such as the consumable supply replenishment request notification or the like by interlocking with the notification managing unit 357 when the result acquired by the stock subtraction passes (or exceeds) a set threshold.

The master information managing unit 362 manages master information which is necessary to display model information, the operation information, part information and the like. Here, the master information corresponds to, for example, a product name of a certain model, the consumable supply information of the consumable supply to be used, the content description of the operation information transmitted from the image processing apparatus 102, a lifetime value of the part, and the like.

The message managing unit 363 generates and manages the message to be displayed on the displaying unit of the image processing apparatus 102. Here, the message indicates an HTML message to be displayed by the message display controlling unit 310 of the image processing apparatus 102. The contents to be displayed as the messages relate to the whole of the maintenances of the image processing apparatus 102 such as the delivery situation of the consumable supply, the dispatch situation of the service person, a notification of the system maintenance performed, a notification of the firmware update performed, and the like.

The device instruction managing unit 364 manages the instruction to be issued to the image processing apparatus 102. The contents of the instructions to be managed by the device instruction managing unit 364 include an instruction of changing an information transmission schedule to the managing server 106, an instruction of updating a firmware, an instruction of reboot, and the like. The instruction to the image processing apparatus 102 is accepted from the sales company user on the portal site or the like, and stored in the storing unit 352 as the instruction to the target image processing apparatus 102. Besides, the device instruction managing unit 364 manages the result of the process performed in regard to the instruction by the image processing apparatus 102, as a status such as "success", "failure", "unknown" or the like.

The firmware information managing unit 365 displays received firmware version information of the image processing apparatus 102 on the portal site, and sets the firmware delivery in cooperation with the firmware managing server 109. When the firmware delivery is set by the firmware managing server 109, the firmware information managing unit 365 registers the firmware update instruction to the device instruction managing unit 364.

FIG. 4 is a sequence diagram for exemplarily describing the process from the registration of the message in the managing server 106 to the display of the message by the message display controlling unit 310 of the image processing apparatus 102. In the sequence diagram, the process to be performed by the managing server 106 is achieved on the premise that the CPU 251 of the managing server 106 reads out and executes the programs stored in the storage device 254 or the like. Besides, the process to be performed by the image processing apparatus 102 is achieved on the premise that the CPU 201 of the image processing apparatus 102 reads out and executes the programs stored in the ROM 203, the storage device 204 or the like.

The managing server 106 accepts the registration of the message from the sales company user PC 110 via the portal site. When the registration of the message is accepted from the sales company user PC 110, in S401, the managing server 106 generates the message and registers the message acquisition instruction to the target image processing apparatus 102.

FIG. 5A is a diagram for illustrating an example of the message registration screen of the portal site. The sales company user can access this screen via the sales company user PC 110 and register the message on this screen.

When a sales company name is selected from the pull-down menu in a message application range 501, all the connected image processing apparatuses 102 under the selected sales company come to be within the target range. Such a process is also applicable to a case where a customer name or a monitor ID is selected in the same manner.

The message registration screen further includes the sections of a message subject 502 and a message content 503. An arbitrary message can be input to the section of the message content 503.

The message registration screen further includes the section of a message display start date 504. Namely, the message is displayed on the displaying unit of the image processing apparatus 102 after the display start date displayed in this section. The message registration screen further includes the section of a message display end date 505. Namely, the display of the message is stopped when the display end date displayed in this section comes.

The message registration screen further includes a save button 506. When the save button 506 is depressed, the message input on the message registration screen is registered in the managing server 106.

When the message is registered, the managing server 106 generates the HTML file as illustrated in FIG. 5B, and registers the message in the message management table (Table 1) held in the storing unit 352.

FIG. 5B is the diagram for exemplarily illustrating the HTML file on the message screen generated by the managing server 106.

Table 1 is an example of the message management table.

TABLE 1

(Message Management Table)

| | |
|---|---|
| Message ID | 0000XXXX1 |
| Generation date and time | 2015/4/16 14:20 |
| Sales company name | ABC Sales |
| Customer name | XX Commercial Company |
| Device ID | DEV000001 |
| Title | Notification of toner delivery |
| Message | Following consumable supply . . . |
| System link | http://delivery.com . . . |
| Display start date | 2015/4/17 |
| Display end date | 2015/4/30 |
| Status | Unread |
| . . . | . . . |

Moreover, the managing server 106 registers an instruction "message acquisition" in the instruction management history table (Table 2) held in the storing unit 352.

Table 2 is an example of the instruction management history table.

TABLE 2

(Instruction Management History Table)

| Serial No. | Instruction date and time | Instruction content | Instruction status | ... |
|---|---|---|---|---|
| DEV00001 | 2015/4/16 14:20 | Message acquisition | Unprocessed | ... |
| DEV00001 | 2015/4/15 0:30 | Firmware update | Success | ... |
| DEV00001 | 2015/4/10 9:26 | Message acquisition | Success | ... |
| ... | ... | ... | ... | ... |

As shown in Table 2, the instruction management history table is generated for each image processing apparatus 102, and consists of the items of the serial number of the image processing apparatus 102, the instruction date and time, the instruction content, the instruction status and the like (the instruction content and the instruction status were described as above). Incidentally, at the time when the instruction is registered in the instruction management history table, the instruction status is "unprocessed".

In S402, the image processing apparatus 102 periodically confirms whether or not an instruction exists, to the managing server 106. When the confirmation of the existence/non-existence of the instruction is transmitted from the image processing apparatus 102 in S402, the managing server 106 actually confirms in S403 the contents of the instruction management history table (Table 2) of the corresponding image processing apparatus 102. As a result of the confirmation, when the instruction "message acquisition" with the instruction status "unprocessed" exists, the managing server 106 returns in S404 a response including the instruction "message acquisition" to the confirmation from the image processing apparatus 102. On the other hand, when the instruction "message acquisition" with the instruction status "unprocessed" does not exist as the result of the confirmation, the managing server 106 returns the response indicating that the confirmation of the existence/non-existence of the instruction from the image processing apparatus 102 was normally received.

When the instruction "message acquisition" is received from the managing server 106 in S404, the device information controlling unit 305 of the image processing apparatus 102 notifies in S405 the status display controlling unit 309 of the fact that the message to be acquired exists.

Figure 6:
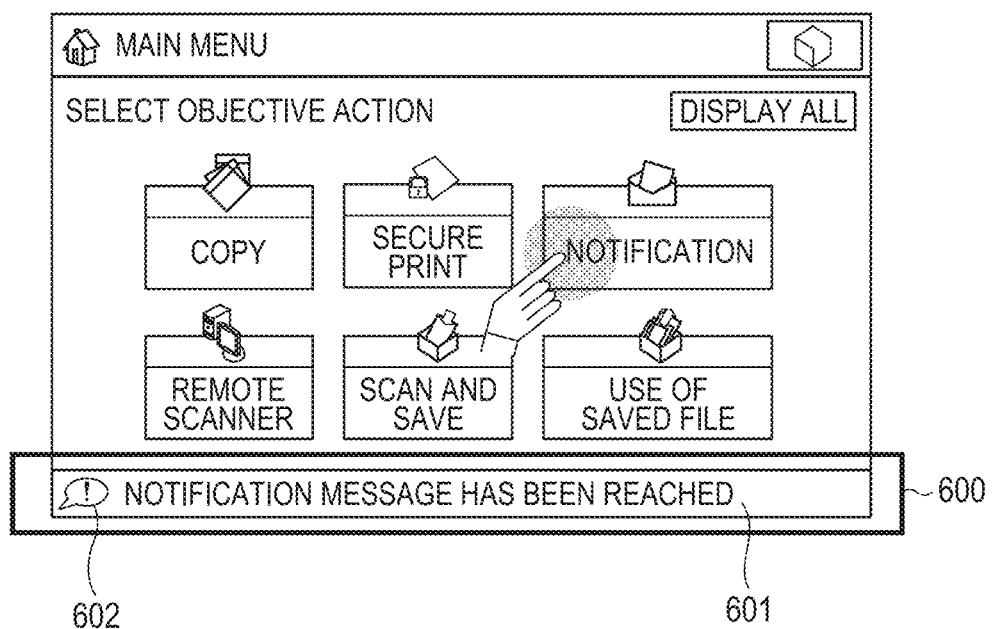
FIG. 6 is a diagram for illustrating an example of a status bar screen displayed on the image processing apparatus.

In S406, the status display controlling unit 309 displays the fact that the message has been reached, on the status bar (see FIG. 6).

FIG. 6 is the diagram for exemplarily illustrating the status bar displayed on the screen of the input/output device 210 of the image processing apparatus 102.

It is possible by a status bar 600 to display that the message has been reached (as a message 601), together with a "notification function" icon 602.

When the "notification function" icon 602 is depressed by a user via the input/output device 210, the message display controlling unit 310 starts the browser function in S407.

Then, in S408, the message display controlling unit 310 requests the data (HTML, etc.) including the message to the managing server 106. At this time, an authentication process is performed between the image processing apparatus 102 and the managing server 106.

In S409, in response to the request in S408, the managing server 106 returns the data including the target message to the message display controlling unit 310. Then, the message display controlling unit 310 receives the returned data.

In S410, based on the data received in S409, the message display controlling unit 310 controls the display of the message to the input/output device 210 by using the browser function. Thus, for example, a message list as illustrated in FIG. 7A is displayed.

FIG. 7A is the diagram for exemplarily illustrating the message list displayed in S410 of FIG. 4.

The messages displayed in the message list include a subject 701 which corresponds to the message subject 502 input on the registration screen (FIG. 5A) of the managing server 106.

The messages further include a registration date and time 702 which indicates the date and time when the message was registered in the managing server 106, and a message status 703 which indicates "unread" or "already read". The messages further include buttons 704 which are activated when the number of the messages exceeds the display upper limit of the screen, and used for page transition. The messages further include a button 705 which is depressed to return the screen from the message list screen, and a button 706 which is depressed to acquire the latest message list screen.

On the message list screen displayed in S410, when a certain message is selected by the customer user, the message display controlling unit 310 displays in S411 the detailed screen of the selected message as illustrated in, e.g., FIG. 7B.

FIG. 7B is the diagram for exemplarily illustrating the detailed screen of the message to be displayed when the certain message is selected from the message list.

The detailed screen to be displayed includes a message subject 710 which corresponds to the message subject 502 as well as the message subject in the above message list. The detailed screen further includes a message content 711 which corresponds to the message content 503 input on the registration screen of the managing server 106, a registration date and time 712 which indicates the date and time when the message was registered in the managing server 106, and a message display end date 713 which corresponds to the message display end date 505 input on the registration screen of the managing server 106. When an OK button 714 on the detailed screen is depressed, the detailed screen is returned to the message list screen of FIG. 7A, and the message status 703 comes to be in the "already read" state.

As described above, since the message display controlling unit 310 displays the message by using the browser function, it is possible to display various messages related to the maintenance and management services for the image processing apparatus on the displaying unit of the image processing apparatus 102.

Incidentally, the message can be updated on the registration screen of the managing server 106, and further the message can be deleted in both the managing server 106 and the image processing apparatus 102.

As illustrated in FIG. 8A, the sales company user can delete the target message by depressing a delete button 800 on the registration screen of the managing server 106.

FIG. 8A is the diagram for exemplarily illustrating the screen to be used when deleting the message on the message registration screen.

Moreover, on the message list screen, the customer user can select the message that he/she wishes to delete by checking, e.g., a box 801 illustrated in FIG. 8B, and delete the selected message by depressing a delete button 802.

Namely, FIG. 8B is the diagram for exemplarily illustrating the screen used when deleting the message on the message list screen.

In addition, for example, it is possible to delete the messages from oldest when the number of the messages exceeds the display upper limit, or it is possible to automatically delete the message when the display end date of the relevant message comes. In the above description, although the registration, update and deletion of the message are performed on the screen of the portal site, the present invention is not limited to these operations. For example, it is also possible to generate, update and delete the above HTML codes by performing registration, update and deletion of the message by the web service.

So far, the flow of the basic process by which the message is manually registered by the sales company user and the registered message is displayed on the screen of the image processing apparatus 102 was described. However, there is a case where the service person certainly visits the customer according to a kind of obstacle occurred in the image processing apparatus 102. On this occasion, the message registration may become a trouble. In consideration of this, the flow of a process of automatically generating a message according to a kind of occurred obstacle will be described hereinafter.

FIG. 9 is a sequence diagram for exemplarily describing the process from the automatic message generation by the managing server 106 according to the obstacle content occurred in the image processing apparatus 102 to the display of the message on the message display controlling unit 310 of the image processing apparatus 102. In the sequence diagram, the process to be performed by the managing server 106 is achieved on the premise that the CPU 251 of the managing server 106 reads out and executes the programs stored in the storage device 254 or the like. Besides, the process to be performed by the image processing apparatus 102 is achieved on the premise that the CPU 201 of the image processing apparatus 102 reads out and executes the programs stored in the ROM 203, the storage device 204 or the like.

In S901, the image processing apparatus 102 transmits, as operation information, the information (error code and/or alarm code) of the obstacle occurred in the image processing apparatus itself to the managing server 106. When the operation information transmitted in S901 is received, the managing server 106 decides in S902 whether or not to automatically generate the message based on the obstacle content. When the error code or the alarm code received as the operation information is included in later-described Table 3 or Table 4, the managing server 106 decides to automatically generate the message corresponding to the relevant obstacle. On the other hand, when the error code or the alarm code received is not included in Table 3 or Table 4, the managing server 106 decides not to automatically generate the message corresponding to the relevant obstacle.

When it is decided in S902 to automatically generate the message, in S903, the managing server 106 automatically generates a message such as "Obstacle was detected by monitoring center" or the like.

Since processes in S904 to S913 are the same as the processes in S402 to S411 in the sequence diagram of FIG. 4, the description thereof will be omitted.

Table 3 is an example of the error table of the automatic generation targets to be used for the decision of the message automatic generation when the received operation information indicates an error. This table is held in the storing unit 352. The error codes existing in this table correspond to the errors with which only the service person can deal.

TABLE 3

(Error Table of Automatic Generation Targets)

| Error Code | Content |
| --- | --- |
| Exx1 | Fixing unit high-temperature detection error |
| Exx2 | Communication error |
| E7xx | Card reader communication error |
| E8xx | Fan error |
| . . . | . . . |

Table 4 is an example of the alarm table of the automatic generation targets to be used for the decision of the message automatic generation when the received operation information indicates an error. This table is held in the storing unit 352.

TABLE 4

(Alarm Table of Automatic Generation Targets)

| Alarm Code | Content |
| --- | --- |
| xxx001 | Toner amount is small (BK) |
| xxx002 | Toner amount is small (C) |
| xxx003 | Toner amount is small (M) |
| xxx004 | Toner amount is small (Y) |
| . . . | . . . |

Incidentally, when the alarm indicating that the remaining amount of the consumable supply is small is received, the managing server 106 notifies the dispatcher, the service person or another person concerned of the sales company of such a fact (this notification is the process different from the main sequence), and thus the shipping and the delivery of the consumable supply are performed. Incidentally, it should be noted that the decision of the automatic generation changes according to whether or not the customer has performed the stock management of the consumable supply, and, in the case where the customer has performed the stock management, according to whether or not the stock amount (or the number of the stocked consumable supply) exceeds a threshold. The process to be performed in such a case will be described with reference to a flow chart, hereinafter.

Figure 10:
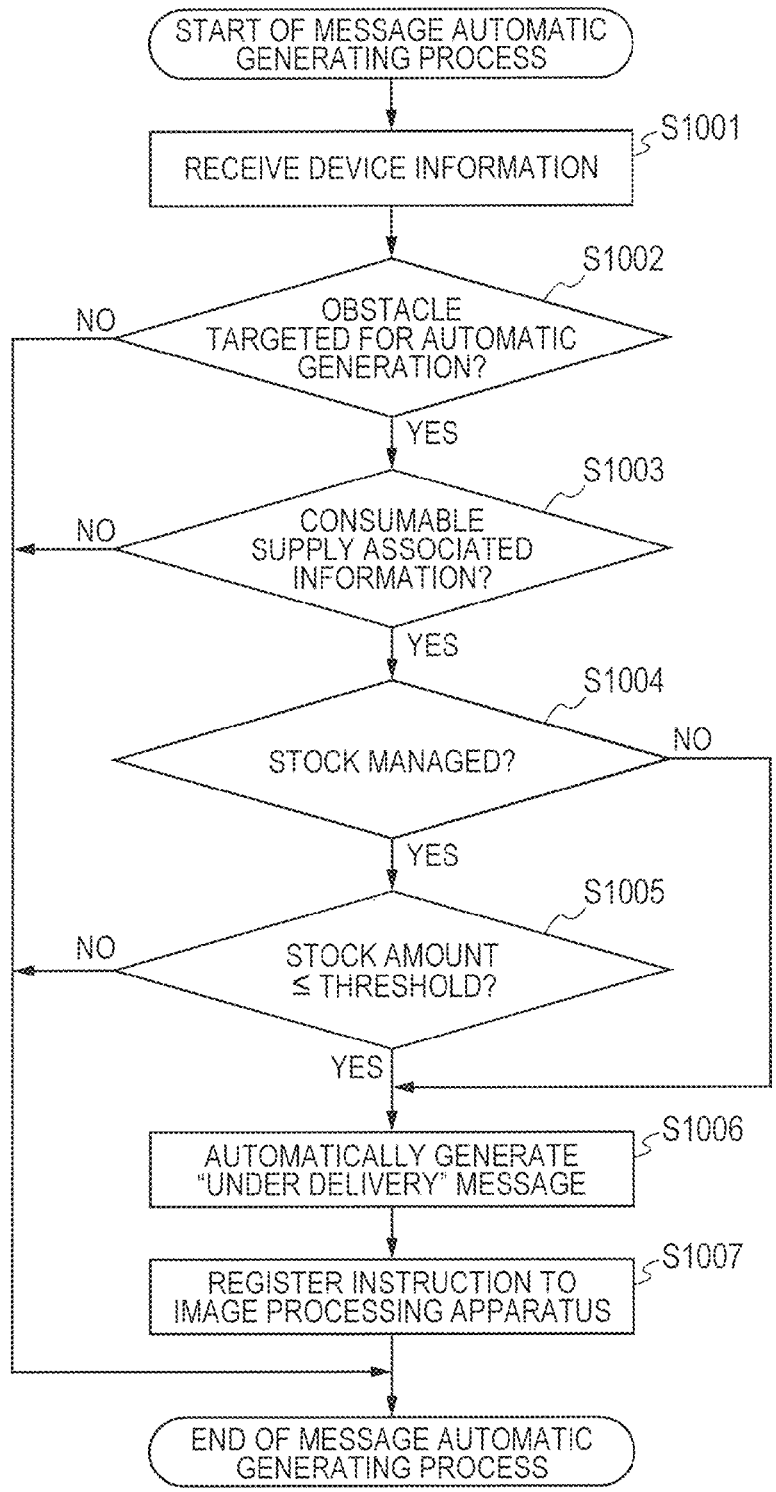
FIG. 10 is a flow chat for describing the message automatic generating process by the managing server.

FIG. 10 is a flow chat for exemplarily describing the process to be performed from the reception of the device information from the image processing apparatus 102 to the automatic generation of the message by the managing server 106. The process in the relevant flow chat is achieved on the premise that the CPU 251 of the managing server 106 reads out and executes the programs stored in the storage device 254 or the like.

In S1001, the managing server 106 receives the device information transmitted from the image processing apparatus 102, and advances the process to S1002.

In S1002, the managing server 106 decides whether or not the received operation information is the information targeted for the message automatic generation. Then, when it is decided that the received operation information is not targeted for the message automatic generation (NO in S1002), the managing server 106 directly ends the process of the flow chart. On the other hand, when it is decided that the received operation information is targeted for the message automatic generation (YES in S1002), the managing server 106 advances the process to S1003.

In S1003, the managing server 106 decides whether or not the received operation information is the information associated with the consumable supply. Then, when it is decided that the received operation information is not the information associated with the consumable supply (NO in S1003), the managing server 106 directly ends the process of the flow chart.

On the other hand, when it is decided that the received operation information is the information associated with the consumable supply (YES in S1003), the managing server 106 advances the process to S1004.

In S1004, the managing server 106 decides whether or not the target image processing apparatus 102 performs the stock management of the consumable supply. Here, it is possible to decide whether or not the image processing apparatus 102 performs the stock management of the consumable supply, on the basis of the information managed by the device information managing unit 359.

When it is decided that the target image processing apparatus 102 does not perform the stock management of the consumable supply (NO in S1004), the managing server 106 directly advances the process to S1006.

On the other hand, when it is decided that the target image processing apparatus 102 performs the stock management of the consumable supply (YES in S1004), the managing server 106 advances the process to S1005.

In S1005, the managing server 106 decides whether or not the stock amount (or the number of the stocked consumable supply) managed by the target image processing apparatus 102 is equal to or smaller than the threshold. Then, when it is decided that the stock amount is not equal to or smaller than the threshold (NO in S1005), the managing server 106 directly ends the process of the flow chart.

On the other hand, when it is decided that the stock amount is equal to or smaller than the threshold (YES in S1005), the managing server 106 advances the process to S1006.

In S1006, the managing server 106 automatically generates the message indicating that the consumable supply is "under delivery", and stores the generated message in the message management table (Table 1).

Next, in S1007, the managing server 106 registers the "message acquisition" instruction to the target image processing apparatus 102 in the instruction management history table (Table 2), and then ends the process of the flow chart.

The message automatic generation is performed not only in response to the above operation information generated by the image processing apparatus 102 but also in response to a firmware update instruction issued in the managing server 106.

The firmware update instruction is issued on the premise that the managing server 106 cooperates with the firmware managing server 109 by the function of the firmware information managing unit 365. Since it is possible to transition from the portal site of the managing server 106 to the portal site of the firmware managing server 109, the sales company user or the like can set the firmware update instruction to the target image processing apparatus 102 on the screen of the transitioned portal site.

The firmware update includes "manual" setting and "automatic" setting.

In the update based on the "manual" setting, the service person directly goes to the customer at which the image processing apparatus 102 has been installed, and performs the update by directly operating the installed image processing apparatus 102.

In the update based on the "automatic" setting, when the firmware update instruction is accepted, the firmware updating unit 304 of the image processing apparatus 102 accesses the firmware managing server 109, acquires the target firmware, and then performs the update based on the acquired firmware (this update is also called automatic delivery).

Based on the above facts, the process in which the managing server 106 automatically generates the message in response to the firmware update instruction will be described with reference to a flow chart illustrated in FIG. 11.

Figure 11:
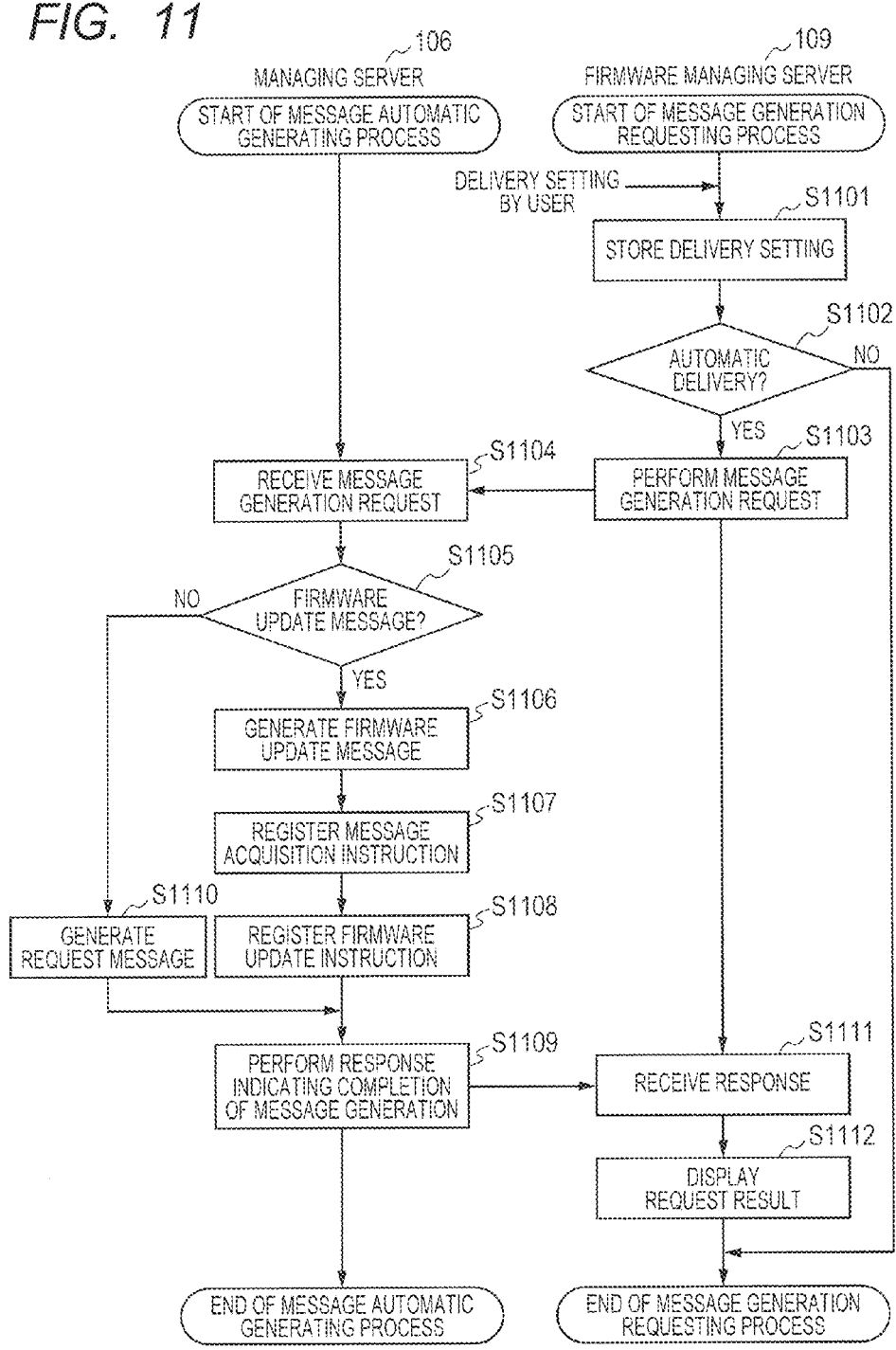
FIG. 11 is a flow chat for describing the message automatic generating process by the managing server.

FIG. 11 is the flow chat for exemplarily describing the process to be performed from the firmware delivery setting in the firmware managing server 109 to the message automatic generation by the managing server 106. The process to be performed by the managing server 106 in the relevant flow chart is achieved on the premise that the CPU 251 of the managing server 106 reads out and executes the programs stored in the storage device 254 or the like. Besides, the process to be performed by the firmware managing sever 109 is achieved on the premise that the CPU 251 of the firmware managing server 109 reads out and executes the programs stored in the storage device 254 or the like.

The process of the relevant flow chart starts at the point when the firmware delivery setting is performed in the firmware managing server 109 by the sales company user using the sales company user PC 110. Here, although there are in fact the above-described processes of the managing server 106 and the firmware managing server 109, the descriptions of these processes will be omitted because they are not the point to be attended in the present embodiment.

Initially, at the portal site of the firmware managing server 109, the firmware delivery setting is performed by the sales company user using the sales company user PC 110. In response to the setting, in S1101, the firmware managing server 109 stores the delivery setting by the sales company user.

Next, in S1102, the firmware managing server 109 decides whether or not the firmware update should be performed automatically, based on the relevant delivery setting. Then, when it is decided that the firmware update is not the "automatic (automatic delivery)" update (i.e., the "manual" update) (NO in S1102), the firmware managing server 109 directly ends the process of the flow chart.

On the other hand, when it is decided that the firmware update is the "automatic (automatic delivery)" update (YES in S1102), the firmware managing server 109 advances the process to S1103.

In S1103, the firmware managing server 109 transmits a message generation request related to the firmware update to the managing server 106. Here, the firmware managing server uses, e.g., the web service or the like installed in the managing server 106, as the means for the message generation request.

In S1104, the managing server 106 receives the message generation request transmitted from the firmware managing server 109, and then advances the process to S1105.

In S1105, the managing server 106 decides whether or not the received message generation request is related to the firmware update.

Then, when it is decided that the received message generation request is not related to the firmware update (NO in S1105), the managing server 106 generates in S1110 the message related to the requested content, and then advances the process to S1109.

On the other hand, when it is decided that the received message generation request is related to the firmware update (YES in S1105), the managing server 106 generates in S1106 the firmware update message. Incidentally, the generated message is registered in the message management table (Table 1) held in the storing unit 352.

When the firmware update message is generated in S1106, the managing server 106 registers in S1107 the instruction "message acquisition" to the instruction management history table (Table 2) held in the storing unit 352.

Next, in S1108, the managing server 106 registers the instruction "firmware update" to the target image processing apparatus 102 in the instruction management history table (Table 2), and then advances the process to S1109.

Incidentally, the registration order of the above instructions has to be "message acquisition"→"firmware update" as described in S1107 and S1108. This is because it is necessary, by previously notifying the customer user of the time at which the firmware update is actually performed, to notice the customer user not to turn off the power supply of the image processing apparatus 102 in the notified period of time. Therefore, the instruction management history table in which the instruction "firmware update" has been registered is shown as, e.g., Table 5.

Table 5 is the table for describing the instruction management history table in which the firmware update instructions have been registered.

TABLE 5

(Instruction Management History Table)

| Serial No. | Instruction date and time | Instruction content | Instruction status | |
|---|---|---|---|---|
| DEV00001 | 2015/4/23 14:20 | Firmware update | Unprocessed | . . . |
| DEV00001 | 2015/4/16 14:20 | Message acquisition | Unprocessed | . . . |
| DEV00001 | 2105/4/15 0:30 | Firmware update | Success | . . . |
| DEV00001 | 2015/4/10 9:26 | Message acquisition | Success | . . . |
| . . . | . . . | . . . | . . . | . . . |

In S1109, the managing server 106 notifies the firmware managing server 109 of the fact (result of request) that the message generation has been completed, as a response to the message generation request received in S1104.

When the response from the managing server 106 is received in S1111, the firmware managing server 109 advances the process to S1112.

In S1112, the firmware managing server 109 displays the result of request received in S1111 on the screen, and then ends the process of the flow chart.

Subsequently, the process to be performed until the message automatically generated by the above firmware update is displayed by the image processing apparatus 102 and the process to be performed until the firmware update is performed will be described with reference to a flow chart.

Figure 12:
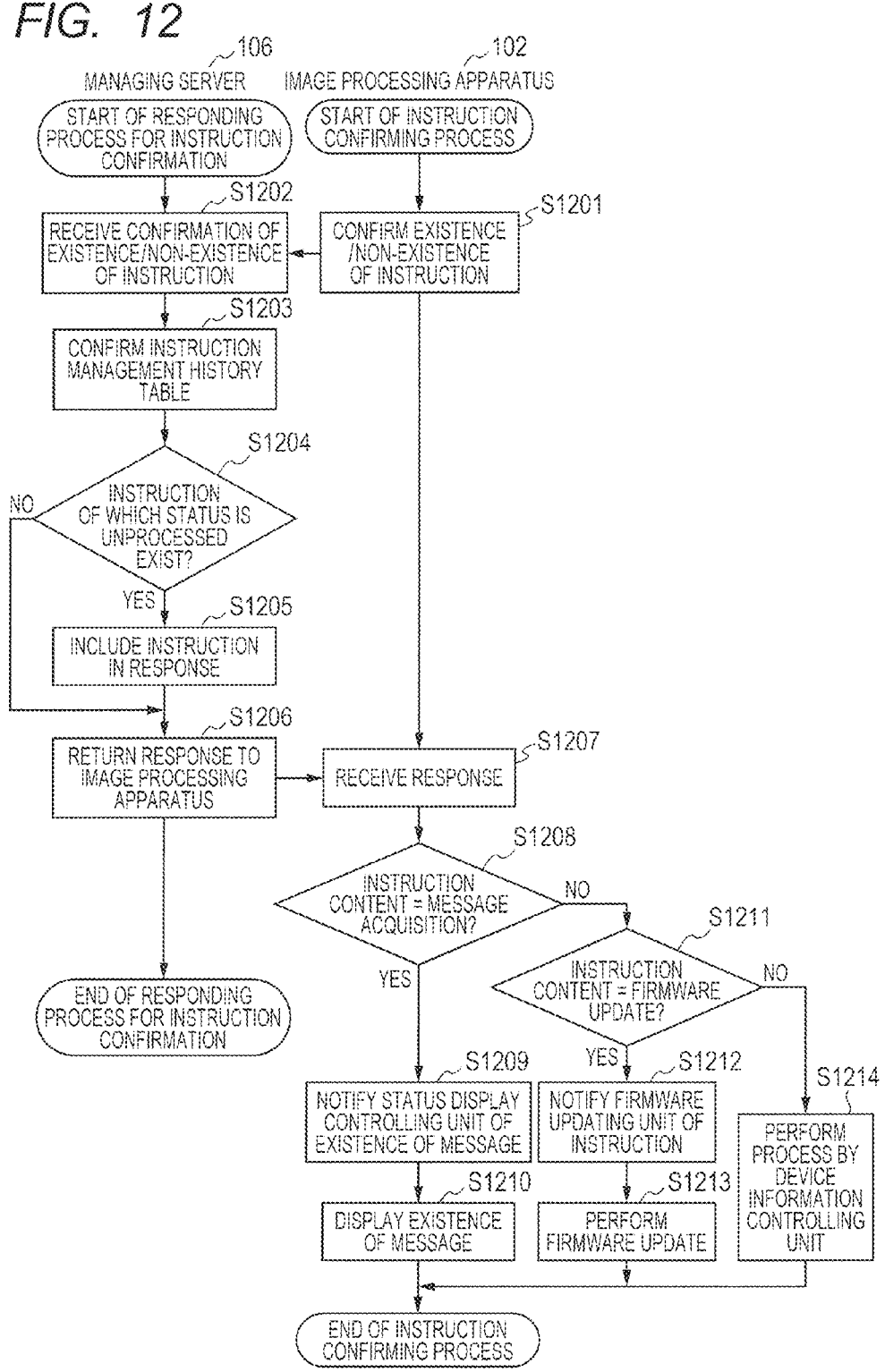
FIG. 12 is a flow chat for describing a notification destination deciding process by the image processing apparatus.

FIG. 12 is a flow chat for exemplarily describing an internal notification destination deciding process to be performed by the image processing apparatus 102 in response to an instruction from the managing server 106. The process to be performed by the managing server 106 in the relevant flow chart is achieved on the premise that the CPU 251 of the managing server 106 reads out and executes the programs stored in the storage device 254 or the like. Besides, the process to be performed by the image processing apparatus 102 is achieved on the premise that the CPU 201 of the image processing apparatus 102 reads out and executes the programs stored in the ROM 203, the storage device 204 or the like.

In S1201, the image processing apparatus 102 confirms existence/non-existence of the instruction with the managing server 106. Incidentally, inquiry transmission for the relevant confirmation from the image processing apparatus 102 to the managing server 106 is periodically performed by the device information controlling unit 305. For example, the transmission is performed every few hours.

In S1202, when the instruction existence/non-existence confirmation from the image processing apparatus 102 is received, the managing server 106 advances the process to S1203.

In S1203, the managing server 106 confirms the instruction management history table (e.g., Table 5) corresponding to the image processing apparatus 102 which received the instruction existence/non-existence confirmation in S1202.

Next, in S1204, the managing server 106 decides whether or not the instruction having the instruction status "unprocessed" exists in the corresponding instruction management history table. When it is decided that the instruction having the instruction status "unprocessed" exists in the instruction management history table (YES in S1204), the managing server 106 advances the process to S1205. In S1205, the managing server 106 includes the instruction having the instruction status "unprocessed" in the response to the image processing apparatus 102, and advances the process to S1206.

On the other hand, when it is decided that the instruction having the instruction status "unprocessed" does not exist in the instruction management history table (NO in S1204), the managing server 106 directly advances the process to S1206 without including the instruction in the response to the image processing apparatus 102.

In S1206, the managing server 106 returns the response to the image processing apparatus 102.

Here, the plurality of instructions having the status "unprocessed" may probably exist.

To deal with such a case, the managing server 106 previously manages the transmission order of the plurality of instructions. Then, the managing server includes, in the response to be returned in S1206, the instruction having the instruction status "unprocessed" to be transmitted first (i.e., the second instruction from the top in the example of Table 5) and the command for causing the device information controlling unit 305 of the image processing apparatus 102 to again perform the instruction existence/non-existence confirmation. Thus, the process is repeatedly performed in the instruction order until the responses to all the instructions are transmitted from the managing server 106 to the device information controlling unit 305. Incidentally, in the case where the plurality of instructions having the status "unprocessed" exist, the managing server 106 may include all the plurality of instructions to a single response.

In S1207, when the response is received, the image processing apparatus 102 advances the process to S1208.

In S1208, the image processing apparatus 102 decides whether or not the instruction content included in the response corresponds to the instruction "message acquisition".

When it is decided that the instruction content corresponds to the instruction "message acquisition" (YES in S1208), the image processing apparatus 102 advances the process to S1209.

In S1209, the instruction information managing unit 307 in the image processing apparatus 102 notifies the status display controlling unit 309 of the fact that the message exists. In response to the notification, in S1210, the status display controlling unit 309 displays, on the status bar of the screen, that the message from the managing server 106 exists, as indicated by the status bar 600 of FIG. 6, and then ends the process of the flow chart.

On the other hand, when it is decided in S1208 that the instruction content does not correspond to the instruction "message acquisition" (NO in S1208), the image processing apparatus 102 advances the process to S1211.

In S1211, the image processing apparatus 102 decides whether or not the instruction content included in the response corresponds to the instruction "firmware update".

When it is decided that the instruction content corresponds to the instruction "firmware update" (YES in S1211), the image processing apparatus 102 advances the process to S1212.

In S1212, the instruction information managing unit 307 in the image processing apparatus 102 notifies the firmware updating unit 304 of the instruction. In response to the notification, in S1213, the firmware updating unit 304 inquires the firmware managing server 109 of the firmware, acquires the firmware from the firmware managing server 109, performs the update, and then ends the process of the flow chart.

On the other hand, when it is decided in S1211 that the instruction content does not correspond to the instruction "firmware update" (NO in S1211), the image processing apparatus 102 advances the process to S1214.

In S1214, the device information controlling unit 305 performs the process according to the instruction content. More specifically, the process to be performed here includes the process of the device information controlling unit 305 in which the instruction contents including the kind of operation information of the image processing apparatus 102 to be monitored, designation of transmission timing and the like are reflected (i.e., a change of the setting related to the monitoring function). Besides, the process to be performed here includes the process of controlling the power supply of the image processing apparatus 102 according to the instruction contents (i.e., again turning on the power supply after turning off it). When the process in S1214 is completed, the image processing apparatus ends the process of the flow chart.

FIG. 13 is a diagram for exemplarily illustrating the firmware update message detailed screen related to the firmware update message which is displayed on the status bar in S1210 of FIG. 12 according to the instruction "message acquisition" registered in S1107 as the acquisition request of the message generated in S1106 of FIG. 11, and acquired and displayed from the managing server 106.

As described above, it is possible to notify the customer user of the firmware update message before the actual firmware update.

Although the message automatic generation was described as above, it is also possible to perform the message automatic update according to the content of the event occurred in the image processing apparatus 102.

The managing server 106 automatically generates the message for the specific operation information as described above. Moreover, the managing server automatically updates the generated message according to the dealing situation of the occurred obstacle.

Table 6 is an example of the table for managing the obstacles occurred in the image processing apparatus 102 and the dealing situations of the obstacles. This table is held in the storing unit 352.

TABLE 6

(Occurred Obstacles and Dealing Situations Management Table)

| Occurrence date and time | Customer Name | Device ID | Obstacle Code | Obstacle Content | Obstacle Type | Dealing Situation |
|---|---|---|---|---|---|---|
| 2015 Feb. 12 10:32 | AAA | DEV 00001 | Exx2-001 | Abnormalities in thermistor, heater, etc. | Error (visit) | In dealing |
| 2015 Feb. 7 13:28 | BPB | DEV 00003 | 01xx01 | Timing sensor delay jam | Jam | Dealt (dispatched) |
| 2015 Jan. 26 08:14 | BBB | DEV 00021 | 6x0001 | Finisher staple alarm | Alarm | Dealing unnecessary |
| 2015 Jan. 20 19:49 | CCC | DEV 00006 | E7xx-002 | Communication error of controller and accessory | Error (tel) | Dealt (tel) |

In Table 6, for example, the obstacle code "Exx2-001" corresponds to the target for the message automatic generation. The dealing situations have been defined as "undealt" "in dealing", "dealt (dispatched)", "dealt (telephone)", and "dealing unnecessary". When the dealing situation changes, the message is updated.

Here, the message automatic update according to the dealing situation includes the following examples.

Dealing situation "undealt"→3f message "Obstacle is detected by monitoring center"

Dealing situation "in dealing"→3f message "Service person is being dispatched"

Dealing situation "dealt"→message "Dealing with occurred obstacle was completed"

When the firmware update is completed, the image processing apparatus 102 notifies the managing server 106 of the result of update. Then, based on the content of the notified result, the content of the firmware update message (FIG. 13) is updated to "Firmware update was correctly completed" or the like.

Incidentally, the language to be used when automatically generating the message is decided and determined based on the location information of the image processing apparatus 102 or the like. Moreover, the operation information which is the target of the automatic generation can be set for the sales company of each country.

In the present embodiment, the mechanism of displaying the message registered in the managing server 106 on the screen of the image processing apparatus 102, the mechanism of automatically generating the message, and the mechanism of automatically updating the message was described.

By the constitution as described above, it is possible to prevent inefficient services such as double delivery of the consumable supply, double dispatch of the service persons, and the like according to the inquiries from the customer user to the sales company.

Moreover, by automatically generating the message according to a certain condition, it is possible to reduce the work load of the sales company user concerning the message registration, and it is thus possible to make the work more efficient.

As just described, it is possible to make the work of the sales company more efficient by appropriately generating manually or automatically the message to be notified to the customer user not only as to the consumable supplies of the image processing apparatus but also as to the maintenance services.

In the present embodiment, although the constitutions of the servers and the apparatuses, the configurations of the software modules, and the flow of the deciding process for temporarily storing the device information were described as above, they are merely the examples. Namely, the present invention is not limited to them.

As described above, according to the first embodiment, in the maintenance and management services for the image processing apparatus, it is possible to notify the customer user of various messages to be notified by displaying them on the displaying unit of the image processing apparatus, and it is thus possible to make the maintenance and management services for the image processing apparatus efficient.

Second Embodiment

The image processing apparatus 102 in the above first embodiment periodically confirms whether or not the instruction exists, with the managing server 106. Therefore, there is a possibility that the registered message is not immediately displayed by the image processing apparatus 102 according to the period of the confirmation. In the second embodiment, a mechanism by which the message registered in the managing server 106 is displayed on the image processing apparatus 102 earlier will be described.

Figure 14:
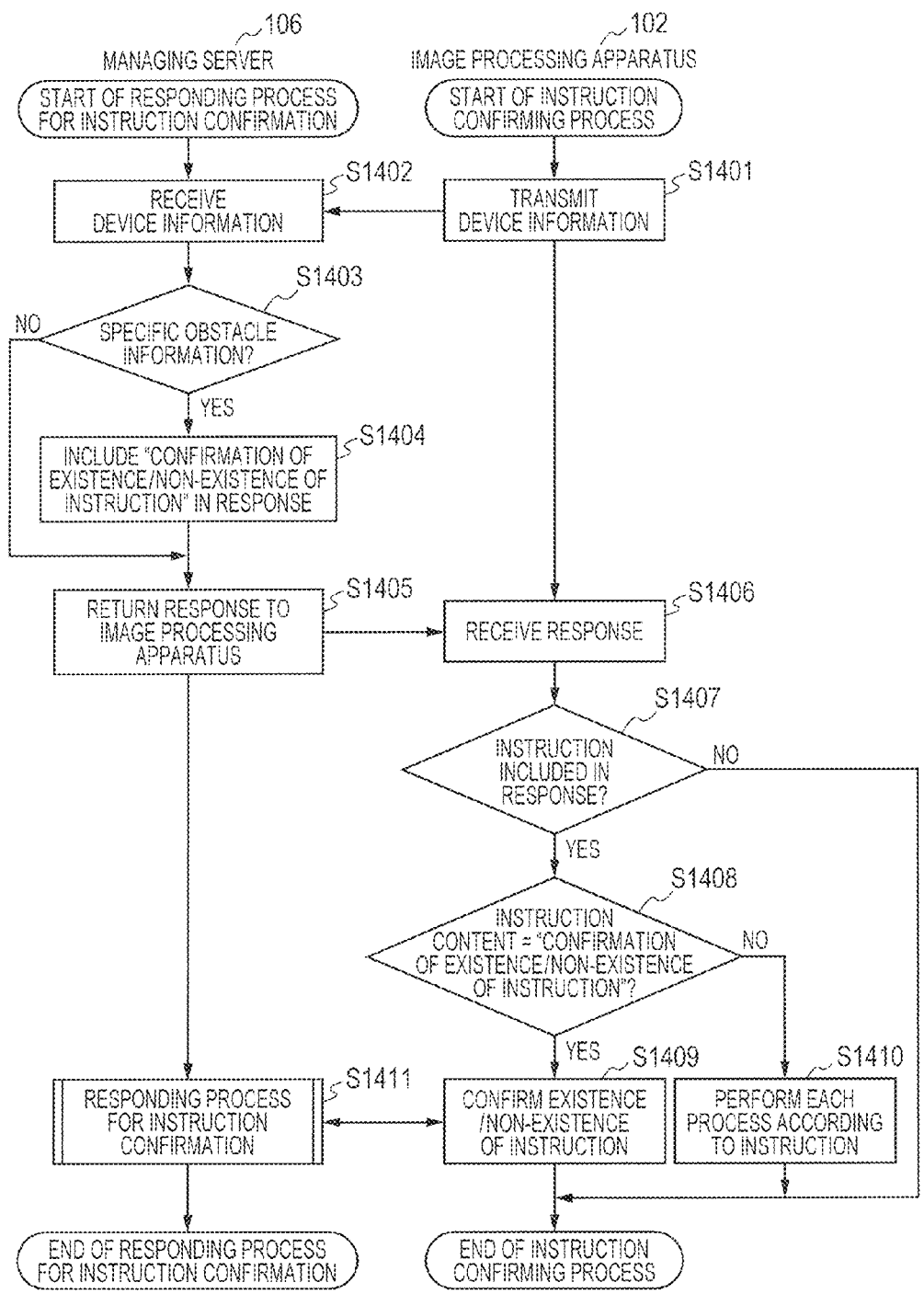
FIG. 14 is a flow chat for describing an instruction confirmation timing changing process by the image processing apparatus.

FIG. 14 is a flow chat for exemplarily describing a process of changing in which the managing server 106 changes timing of "confirmation of existence/non-existence of instruction" in response to reception of the device information transmitted from the image processing apparatus 102. The process to be performed by the managing server 106 in the relevant flow chart is achieved on the premise that the CPU 251 of the managing server 106 reads out and executes the programs stored in the storage device 254 or the like. Besides, the process to be performed by the image processing apparatus 102 is achieved on the premise that the CPU 201 of the image processing apparatus 102 reads out and executes the programs stored in the ROM 203, the storage device 204 or the like.

In S1401, the image processing apparatus 102 transmits the device information such as the operation information or the like to the managing server 106.

When the device information is received in S1402, the managing server 106 advances the process to S1403.

In S1403, the managing server 106 decides whether or not the device information received in S1402 is specific obstacle information (specific operation information). Here, it is decided whether or not the received device information is the specific obstacle information, by referring to the tables (Tables 3 and 4) as well as the decision of the message automatic generation described in the first embodiment.

Then, when it is decided that the received device information is the specific obstacle information (YES in S1403), the managing server 106 advances the process to S1404. In S1404, the managing server 106 includes the instruction "confirmation of existence/non-existence of instruction" in the response to the reception in S1402, and then advances the process to S1405.

On the other hand, when it is decided that the received device information is not the specific obstacle information (NO in S1403), the managing server 106 advances the process to S1405 without including the instruction in the response to the reception in S1402.

In S1405, the managing server 106 returns the response to the image processing apparatus 102.

When the response from the managing server 106 is received in S1406, the image processing apparatus 102 advances the process to S1407.

In S1407, the image processing apparatus 102 confirms or decides whether or not the instruction is included in the response received in S1406. When it is decided that the instruction is not included in the received response (NO in S1407), the image processing apparatus 102 directly ends the process of the flow chart.

On the other hand, when it is decided that the instruction is included in the received response (YES in S1407), the image processing apparatus 102 advances the process to S1408.

In S1408, the image processing apparatus 102 decides whether or not the content of the instruction included in the response is "confirmation of existence/non-existence of instruction". Then, when it is decided that the content of the instruction included in the response is not "confirmation of existence/non-existence of instruction" (NO in S1408), in S1410, the image processing apparatus 102 performs the process according to the instruction, and then ends the process of the flow chart.

On the other hand, when it is decided that the content of the instruction is "confirmation of existence/non-existence of instruction" (YES in S1408), in S1409, the image processing apparatus 102 immediately confirms the existence/non-existence of the instruction with the managing server 106 irrespective of the timing of the instruction confirmation by the periodical polling (e.g., S401 of FIG. 4).

When the confirmation of the existence/non-existence of the instruction is transmitted from the image processing apparatus 102, the managing server 106 performs a process of responding to the instruction confirmation in S1411. Incidentally, since the processes in S1409, S1411 and the following step were already described in the sequence diagrams of FIGS. 4 and 9 and the flow chart of FIG. 12 in the first embodiment, the description thereof will be omitted in the present embodiment.

As above, in the second embodiment, the mechanism of immediately confirming the existence/non-existence of the instruction to the managing server 106 by including the instruction (existence/non-existence confirmation of the instruction) in the response to the operation information transmitted from the image processing apparatus 102 was described. By this mechanism, the image processing apparatus 102 can immediately detect that the registered message exists in the managing server 106, by transmitting the operation information and performing the instruction "confirmation of existence/non-existence of instruction" included in the response to the transmitted operation information. Thus, it is possible to display the message intended to be notified to the user, on the image processing apparatus 102 more quickly and in substantially real time.

Moreover, on the premise that the managing server 106 includes an instruction to shorten the interval of "confirmation of existence/non-existence of instruction" in the response, it may be possible to increase the frequency of "confirmation of existence/non-existence of instruction" of the image processing apparatus 102 from the occurrence of the obstacle to the completion of the dealing. In such a case, the managing server 106 includes an instruction to return the interval of "confirmation of existence/non-existence of instruction" to the original interval in the response when the status of the obstacle becomes "dealt", so as to return the interval of "confirmation of existence/non-existence of instruction" to the original interval. Thus, it is possible to more quickly display the message intended to be notified to the user, on the image processing apparatus 102.

Third Embodiment

According to the content of the instruction related to the process to be performed by the image processing apparatus 102, there is a case where it is necessary to actually perform the process after an agreement of the customer user or a confirmation of the message. In this case, when generating the message, the managing server 106 creates or forms the HTML file corresponding to the screen (e.g., FIG. 15) on which the necessary agreement is acquired, and then performs the process in response to the acquirement of the "agreement" by the customer on the screen. Alternatively, the managing server 106 may perform the process when the message becomes "already read".

FIG. 15 is the diagram for exemplarily illustrating the message detailed screen of the firmware update message according to the third embodiment. A "YES" button (instructing unit) 1501 is depressed when the customer user agrees with (accepts) update of the firmware. When the "YES" button 1501 is depressed or instructed, the firmware is updated in the image processing apparatus 102 at an update scheduled date and time.

A "NO" button (instructing unit) 1502 is depressed when the customer user does not agree with the update of the firmware. When the "NO" button 1502 is depressed or instructed, the firmware is not updated in the image processing apparatus 102 at the update scheduled date and time. For example, the image processing apparatus 102 is constituted to ignore the firmware update instruction received from the managing server 106. Otherwise, for example, when the firmware update instruction is not yet transmitted to the image processing apparatus 102, the managing server 106 deletes the relevant firmware update instruction. On the other hand, when the firmware update instruction has already been transmitted to the image processing apparatus 102, the managing server 106 may newly transmit an instruction not to perform the process of the firmware update instruction to the image processing apparatus 102.

By the above constitution, since the image processing apparatus 102 does not automatically perform the process based on the instruction transmitted from the managing server 106 without the agreement of the customer user, the image processing apparatus 102 can normally perform the process based on the instruction irrespective of use of the image processing apparatus 102 by the customer user. For example, it is possible to more certainly restrain the firmware update from being not normally performed. More specifically, it is possible to prevent that the firmware is updated without the agreement of the customer user, and it is possible to prevent that the power supply of the image processing apparatus 102 is carelessly turned off while the firmware is being updated. Besides, it is possible to prevent that the customer user cannot use the image processing apparatus in the operation hours that the customer user frequently uses this apparatus, because the firmware update is performed in the relevant operation hours.

Fourth Embodiment

According to the mechanisms respectively described in the above first to third embodiments, the customer user can know based on the message whether or not the consumable supply is being arranged or provided. However, in order that the customer user knows the details (acceptance completion, shipping completion, in delivery, etc.) of the delivery situation, cooperation between the managing server 106 and the delivery system of the sales company is necessary. However, the cooperation between the managing server 106 and the delivery system takes development costs. Besides, when the delivery company is changed or when the delivery system is repaired, there is a possibility that also repair of the managing server 106 becomes necessary. In this context, in the fourth embodiment, a mechanism by which the customer user can directly confirm, in the delivery system, the delivery situation of the consumable supply will be described.

Figure 16:
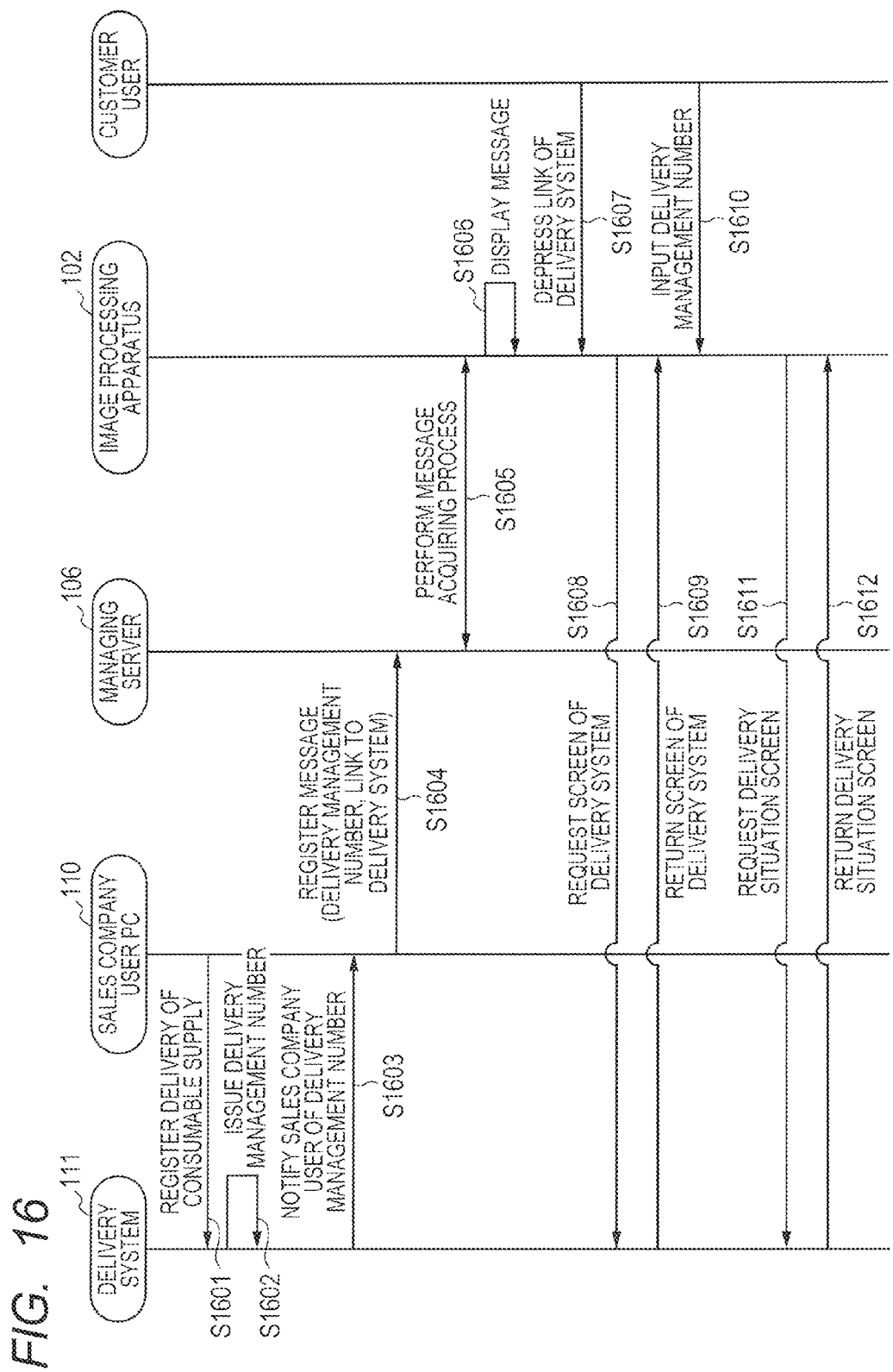
FIG. 16 is a sequence diagram for describing a process in which a customer user confirms a delivery situation.

FIG. 16 is a sequence diagram for describing the process to be performed until the customer user refers to the delivery situation of the consumable supply. In the drawing, the process to be performed by the delivery system 111 is achieved on the premise that the CPU 251 of the delivery system 111 reads out and executes the programs stored in the storage device 254 or the like. Besides, the process to be performed by the sales company user PC 110 is achieved on the premise that the CPU 251 of the sales company user PC 110 reads out and executes the programs stored in the storage device 254 or the like. Besides, the process to be performed by the managing server 106 is achieved on the premise that the CPU 251 of the managing server 106 reads out and executes the programs stored in the storage device 254 or the like. Besides, the process to be performed by the image processing apparatus 102 is achieved on the premise that the CPU 201 of the image processing apparatus 102 reads out and executes the programs stored in the ROM 203, the storage device 204 or the like.

In S1601, the sales company user registers the delivery of the consumable supply to the delivery system, by using the sales company user PC 110.

In S1602, the delivery system 111 issues the delivery management number according to the registration of the delivery of the consumable supply.

Next, in S1603, the delivery system 111 notifies the issued delivery management number to the sales company user who registered the delivery of the consumable supply. Such a notification may be displayed on the browser screen of the sales company user PC 110 which displays the portal site of the managing server 106, or may be performed by a notification mail to the e-mail address of the sales company user. Of course, it may be possible to perform the relevant notification by another notifying method.

In S1604, by using the sales company user PC 110, the sales company user registers the message including the delivery management number notified in S1603 and the link to the delivery system, to the managing server 106, as illustrated in FIG. 17. In response to such registration, the managing server 106 generates the message and registers the acquisition instruction. It should be noted that this process is the same as that in S401 of FIG. 4.

FIG. 17 is the diagram for illustrating an example of the screen in case of registering the delivery situation message on the message registration screen.

In S1605, the managing server 106 and the image processing apparatus 102 perform the message acquiring process in regard to the registered message. It should be noted that this process is the same as those in S402 to S409 of FIG. 4.

Figure 18:
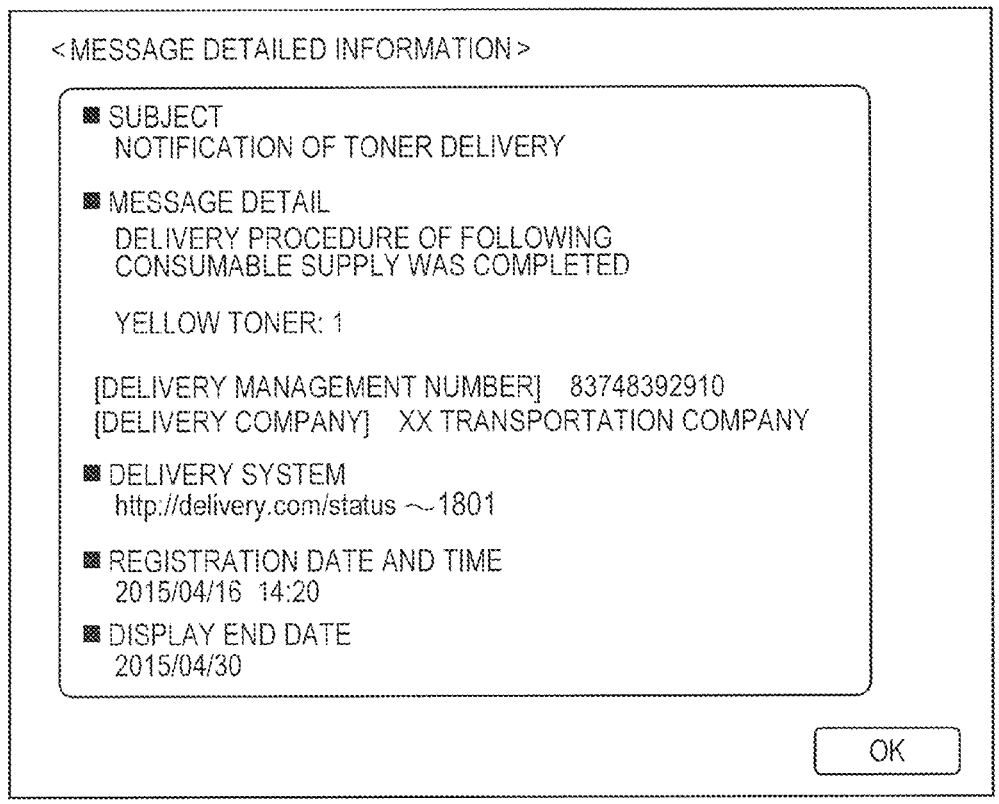
FIG. 18 is a diagram for illustrating an example of the delivery situation message screen to be displayed on the image processing apparatus.

Next, in S1606, the image processing apparatus 102 displays the message acquired in the process of S1605 on the screen as illustrated in, e.g., FIG. 18. It should be noted that this process is the same as those in S410 and S411 of FIG. 4.

FIG. 18 is the diagram for illustrating an example of the detailed screen of the consumable supply delivery situation message.

On the screen, when a delivery system link 1801 is depressed, it is possible to request the screen (HTML) of the delivery system to the delivery system and display it on the browser.

In S1607, when the customer user depresses the delivery system link 1801 on the displayed delivery situation message screen, the image processing apparatus 102 accesses in S1608 the delivery system to request the screen (HTML) of the delivery system.

In S1609, the delivery system 111 returns the delivery situation retrieval screen of the delivery system to the image processing apparatus 102, in response to the request from the image processing apparatus 102.

Figure 19A:
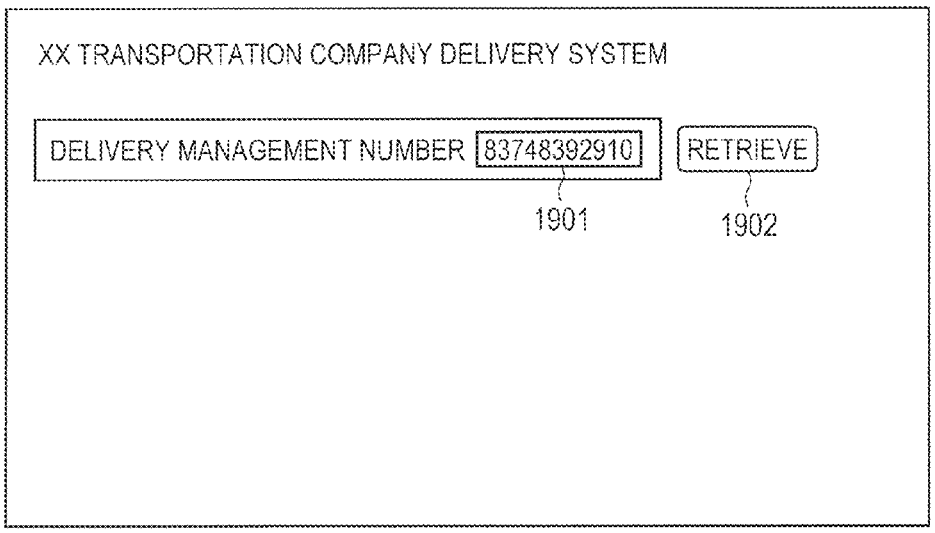
FIGS. 19A and 19B are diagrams for respectively illustrating the delivery system retrieval screen and the delivery information screen to be displayed on the image processing apparatus.

FIG. 19A is a diagram for exemplarily illustrating the delivery situation retrieval screen of the delivery system 111.

The delivery situation retrieval screen includes a delivery management number input section 1901 and a retrieval button 1902. When the retrieval button 1902 is depressed in the state that the delivery management number has been input in the delivery management number input section 1901, the delivery situation corresponding to the input delivery management number is retrieved by the delivery system 111.

Incidentally, it may be possible to automatically set, in the delivery management number input section 1901, the delivery management number acquired from the detailed screen of the consumable supply delivery situation message illustrated in FIG. 18.

In S1610, the customer user inputs the delivery management number in the delivery management number input section 1901 of the delivery system retrieval screen as illustrated in FIG. 19A, and depresses the retrieval button 1902. Thus, in S1611, the image processing apparatus 102 accesses the delivery system to request acquirement of the delivery situation screen, in response to the input and depression.

Figure 19B:
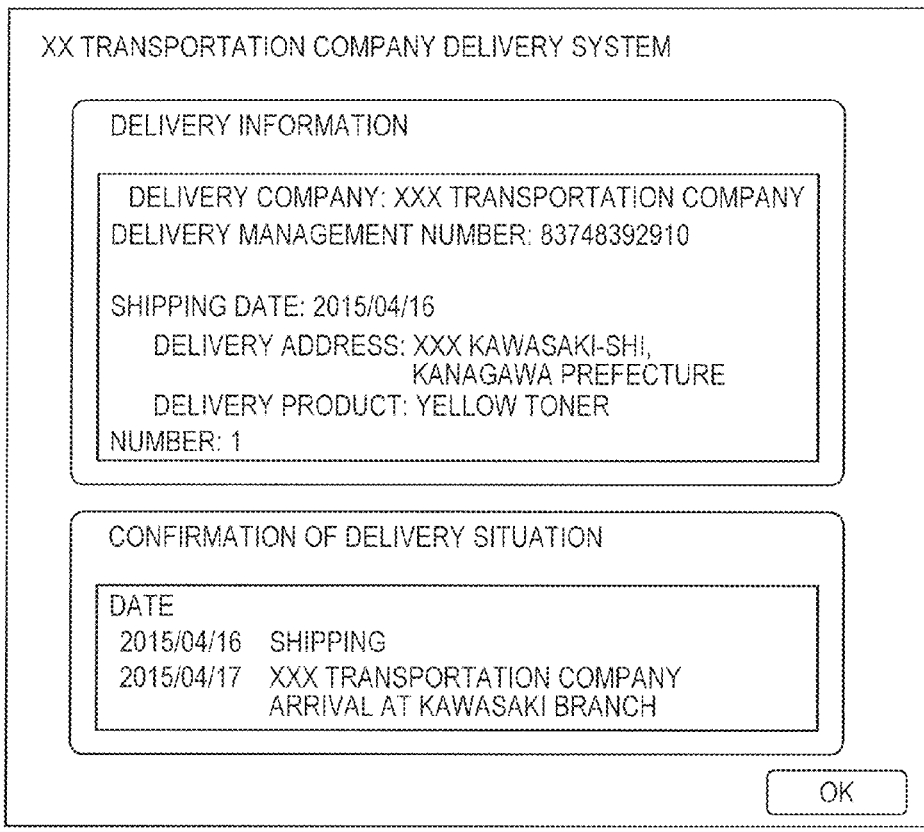

In S1612, the delivery system 111 retrieves the corresponding delivery situation in response to the request of S1611, and then returns the delivery situation screen including the retrieval result (e.g., a screen as illustrated in FIG. 19B) to the image processing apparatus 102.

FIG. 19B is the diagram for exemplarily illustrating the delivery situation screen of the delivery system 111.

Thus, the customer user can know the delivery situation of the consumable supply without confirming it with the sales company. In the fourth embodiment, the delivery information is input by the sales company user on the message registration screen. However, the delivery system may register the message to the managing server 106 by using the web service or the like when the delivery of the consumable supply is registered in the delivery system. In doing so, the delivery information is automatically included in the message only by the registration of the delivery by the sales company user, the work load for the sales company user is reduced. As described above, the message display controlling unit 310 displays the message by using the browser function. Thus, it is possible to easily transition the screen to the delivery system screen (HTML) by the depression of the delivery system link 1801 and thus confirm the delivery situation.

Incidentally, in the present embodiment, the page information which includes the message related to the delivery of the consumable supply displayed by the message display controlling unit 310 with use of the web browser function includes the link information of the website related to the delivery of the relevant consumable supply. However, the link information is not limited to the link information of the website related to the delivery of the consumable supply. Namely, the link information which is included in the page information displayed by the message display controlling unit 310 with use of the web browser function may be link information for any system, if it is the link information of the website related to the message.

As described above, according to the embodiments of the present invention, the sales company user registers the message that he/she wishes to display on the screen of the image processing apparatus 102, to the managing server 106. The image processing apparatus 102 periodically inquires of the managing server 106 whether or not the instruction (message) to the image processing apparatus itself exists. When the message exists, the image processing apparatus displays that the message exists, on the status bar of the screen. Then, when the customer user depresses the icon for message display, the image processing apparatus 102 starts the browser, acquires the message from the managing server 106, and displays the acquired message. By the constitution like this, the sales company user can surely notify the customer user of various messages to be notified to the customer user in the maintenance and management services for the image processing apparatus 102, by easily displaying them on the displaying unit of the image processing apparatus 102. Thus, it is possible to make the maintenance and management services for the image processing apparatus 102 efficient. Moreover, it is possible to instruct agreement or refusal in regard to the content of the message, from the message display screen. Moreover, it is possible to acquire the information related to the message, by transitioning to the web screen of another system related to the message of the delivery system or the like.

Incidentally, the above configurations and contents of various data are not limited to those as described above. Namely, various data may include various configurations and contents according to purposes and intended uses.

Although the embodiments were described as above, the present invention can be carried out as, e.g., a system, an apparatus, a method, a program, a storage medium or the like. More specifically, the present invention may be applicable to a system which consists of a plurality of devices or to an apparatus which consists of a single device.

Moreover, also the constitution which is acquired by combining the above embodiments is included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132539, filed Jul. 1, 2015, which is hereby incorporated by reference herein in its entirety.

What is claimed is:

1. A system which includes a first server and an image processing apparatus communicating with the first server, wherein:
the first server comprises a first memory storing instructions, and a first processor which is capable of executing the instructions in the first memory causing the first server to:
generate page information including a message related to an input instruction, and first instruction information corresponding to the input instruction;
issue a notification based on the generated first instruction information to the image processing apparatus, in response to an inquiry about instruction information from the image processing apparatus; and
provide the generated page information to a request using a web browser from the image processing apparatus, and
the image processing apparatus comprises a display device, a second memory storing instructions, and a second processor which is capable of executing the instructions in the second memory causing the image processing apparatus to:
transmit operation information of the image processing apparatus to the first server;
perform the inquiry about the instruction information to the first server at periodical timing;
display, in response to the notification based on the first instruction information from the first server to the inquiry about the instruction information, a message corresponding to the notification in a status display area of the display device;
acquire, by using a web browser, the page information including a message related to the first instruction information provided from the first server; and
display the provided message on the display device by using the page information.

2. The system according to claim 1, wherein the instructions in the second memory further cause the image processing apparatus to perform an inquiry for an update of software of the image processing apparatus to a second server, in response to a notification based on second instruction information from the first server to the inquiry about the instruction information.

3. The system according to claim 2, wherein
in a case where an instruction for the update of the software is input to the first server, the first server generates page information including a message related to the update, the first instruction information corresponding to the update, and the second instruction information corresponding to the update, and
wherein the instructions in the second memory further cause the image processing apparatus to receive, to the inquiry about the instruction information, a notification based on the first instruction information and the notification based on the second instruction information in that order from the first server.

4. The system according to claim 3, wherein
in the case where the instruction for the update of the software is input to the first server, a content which is displayed by using the page information including the message related to the update generated by the first server includes an instruction portion for agreeing to or refusing the update of the software.

5. The system according to claim 1, wherein
in a case where a response from the first server to the transmission of the operation information includes an instruction for confirming existence/non-existence of the instruction information, the inquiry about the instruction information to the first server is performed irrespective of the periodical timing.

6. The system according to claim 1, wherein the message displayed by using the page information includes link information of a related website.

7. The system according to claim 6, wherein
in a case where the message displayed by using the page information is related to delivery of a consumable supply of the image processing apparatus, link information of a website related to the delivery of the consumable supply is included as the link information of the related website.

8. The system according to claim 1,
wherein the first server has a predetermined recording area for managing the generated first instruction information, and
wherein the instructions in the first memory further cause the first server to delete, at a timing indicating a display end of the message related to the first instruction information, the first instruction information corresponding to the message from the predetermined recording area.

9. A method for a system which includes a first server and an image processing apparatus communicating with the first server, the method comprising:

in the first server, generating page information including a message related to an input instruction, and first instruction information corresponding to the input instruction;

in the image processing apparatus, periodically performing an inquiry about instruction information to the first server;

in the first server, issuing a notification based on the generated first instruction information to the image processing apparatus, in response to the inquiry about the instruction information from the image processing apparatus;

in the image processing apparatus, displaying, in response to the notification based on the first instruction information from the first server, a message corresponding to the notification in a status display area of a displaying unit of the image processing apparatus;

in the image processing apparatus, performing a request of the page information including a message related to the first instruction information provided from the first server, by using a web browser;

in the first server, providing the generated page information to the request using the web browser from the image processing apparatus; and in the image processing apparatus, displaying, using the web browser, the message on the displaying unit of the image processing apparatus by using the provided page information.

* * * * *